US 6,557,116 B1

(12) United States Patent
Swoboda et al.

(10) Patent No.: US 6,557,116 B1
(45) Date of Patent: Apr. 29, 2003

(54) EMULATION SUSPENSION MODE WITH FRAME CONTROLLED RESOURCE ACCESS

(75) Inventors: Gary L. Swoboda, Sugarland, TX (US); David R. Matt, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/483,697

(22) Filed: Jan. 14, 2000

Related U.S. Application Data

(60) Provisional application No. 60/120,809, filed on Feb. 19, 1999.

(51) Int. Cl.[7] .............................................. G06F 11/30
(52) U.S. Cl. ........................... 714/28; 714/27; 714/30; 714/34
(58) Field of Search .......................... 714/28, 27, 34, 714/25, 30; 717/124

(56) References Cited

U.S. PATENT DOCUMENTS

| 5,737,516 | A |   | 4/1998  | Circello et al.  | 395/183.14 |
| 5,828,824 | A | * | 10/1998 | Swoboda          | 714/25     |
| 5,884,023 | A | * | 3/1999  | Swoboda et al.   | 714/30     |
| 5,983,017 | A | * | 11/1999 | Kemp et al.      | 717/129    |
| 6,065,078 | A | * | 5/2000  | Falik et al.     | 710/100    |
| 6,065,106 | A | * | 5/2000  | Deao et al.      | 712/24     |
| 6,112,298 | A | * | 8/2000  | Deao et al.      | 712/227    |
| 6,145,122 | A | * | 11/2000 | Miller et al.    | 717/129    |
| 6,189,140 | B1| * | 2/2001  | Madduri          | 717/128    |
| 6,317,593 | B1| * | 11/2001 | Vossler          | 455/414    |
| 6,324,684 | B1| * | 11/2001 | Matt et al.      | 717/124    |

* cited by examiner

*Primary Examiner*—Robert Beausoliel
*Assistant Examiner*—Yolanda L. Wilson
(74) *Attorney, Agent, or Firm*—Gerald E. Laws; W. James Brady, III; Frederick J. Telecky, Jr.

(57) ABSTRACT

Emulation and debug circuitry is provided that can be incorporated into a variety of digital systems. A stop mode of operation is provided in which an associated processor stops processing instructions in response to a debug event. A real-time mode of operation is provided in which the processor stops processing background instructions in response to a debug event, but in which high priority interrupts are still processed. Interrupts are classified and processed accordingly when the processor is stopped by a debug event. While suspended for a debug event, a frame counter keeps track of interrupt debug state if multiple interrupts occur. While running or suspended, the emulation circuitry can jam an instruction into the instruction register of the processor to cause processor resources to be read or written on behalf of the emulation circuitry. Read/write transactions are qualified by an expected frame count to maintain correspondence between test host software and multiple debug/interrupt events. Architecture and instruction set are optimized for low power consumption and high efficiency execution of DSP algorithms, such as for wireless telephones, as well as pure control tasks.

11 Claims, 12 Drawing Sheets

INTERRUPT FLAG REGISTER (IFRn)

| 15 | 14 | 13 | 12 | 11 | 10 | 9 | 8 |
|---|---|---|---|---|---|---|---|
| RTOSINT | DLOGINT | INT14 | INT13 | INT12 | INT11 | INT10 | INT9 |
| R/W-0 | R/W-0 | R/W-0 | R/W-0 | R/W-0 | R/W-0 | R/W-0 | R/W-0 |

| 7 | 6 | 5 | 4 | 3 | 2 | 1 | 0 |
|---|---|---|---|---|---|---|---|
| INT8 | INT7 | INT6 | INT5 | INT4 | INT3 | INT2 | INT1 |
| R/W-0 | R/W-0 | R/W-0 | R/W-0 | R/W-0 | R/W-0 | R/W-0 | R/W-0 |

NOTE: R=READ ACCESS; W=WRITE ACCESS; VALUE FOLLOWING DASH (-) IS VALUE AFTER RESET.

INTERRUPT ENABLE REGISTER (IER)

| 15 | 14 | 13 | 12 | 11 | 10 | 9 | 8 |
|---|---|---|---|---|---|---|---|
| RTOSINT | DLOGINT | INT14 | INT13 | INT12 | INT11 | INT10 | INT9 |
| R/W-0 | R/W-0 | R/W-0 | R/W-0 | R/W-0 | R/W-0 | R/W-0 | R/W-0 |

| 7 | 6 | 5 | 4 | 3 | 2 | 1 | 0 |
|---|---|---|---|---|---|---|---|
| INT8 | INT7 | INT6 | INT5 | INT4 | INT3 | INT2 | INT1 |
| R/W-0 | R/W-0 | R/W-0 | R/W-0 | R/W-0 | R/W-0 | R/W-0 | R/W-0 |

NOTE: R=READ ACCESS; W=WRITE ACCESS; VALUE FOLLOWING DASH (-) IS VALUE AFTER RESET.

*FIG. 9*

DEBUG INTERRUPT ENABLE REGISTER (DBGIER)

| 15 | 14 | 13 | 12 | 11 | 10 | 9 | 8 |
|---|---|---|---|---|---|---|---|
| RTOSINT | DLOGINT | INT14 | INT13 | INT12 | INT11 | INT10 | INT9 |
| R/W-0 | R/W-0 | R/W-0 | R/W-0 | R/W-0 | R/W-0 | R/W-0 | R/W-0 |

| 7 | 6 | 5 | 4 | 3 | 2 | 1 | 0 |
|---|---|---|---|---|---|---|---|
| INT8 | INT7 | INT6 | INT5 | INT4 | INT3 | INT2 | INT1 |
| R/W-0 | R/W-0 | R/W-0 | R/W-0 | R/W-0 | R/W-0 | R/W-0 | R/W-0 |

NOTE: R=READ ACCESS; W=WRITE ACCESS; VALUE FOLLOWING DASH (-) IS VALUE AFTER RESET.

*FIG. 10*

EMULATION SUSPENSION MODE WITH FRAME CONTROLLED RESOURCE ACCESS

CROSS REFERENCE TO RELATED APPLICATIONS

This application claims priority under 35 USC §119(e)(1) of Provisional Application No. 60/120,809, filed Feb. 19, 1999.

This application is related to co-assigned application S.No. 60/120,809; Ser. Nos. 09/481,852; 09/483,568; 09/489,902; S.Nos. 60/120,683; 60/120,960; 60/120,791; 60/120,810; 60/120,667; and Ser. No. 09/154,385; filed contemporaneously herewith and incorporated herein by reference.

FIELD OF THE INVENTION

The present invention relates to digital microprocessors, and more particularly to emulating and debugging digital microprocessors.

BACKGROUND OF THE INVENTION

As the technology for manufacturing integrated circuits advances, more and more logic functions may be included in a single integrated circuit device. Modern integrated circuit (IC) devices include large numbers of gates on a single semiconductor chip, with these gates interconnected so as to perform multiple and complex functions, such as, for example, those in a general-purpose microprocessor. The manufacture of such circuits incorporating such Very Large Scale Integration (VLSI) requires that the fabrication of the circuit be error free, as some manufacturing defects may prevent it from performing all of the functions that it is designed to perform. This requires verification of the design of the circuit and also various types of electrical testing after manufacture.

In conjunction with the stuck-fault modeling and associated test generation, other circuitry may be included in the VLSI circuit specifically designed to improving its testability. One type of test circuitry is a scan path in the logic circuit. A scan path consists of a chain of synchronously clocked master/slave latches (or registers), each of which is connected to a particular node in the logic circuit. These latches can be loaded with a serial data stream ("scan in") presetting the logic circuit nodes to a predetermined state. The logic circuit then can be exercised in normal fashion, with the result of the operation (at each of the nodes having a scan latch) stored in its respective latch. By serially unloading the contents of the latches ("scan out"), the result of the particular test operation at the associated nodes is read out and may be analyzed for improper node operation. Repetition of this operation with a number of different data patterns effectively tests all necessary combinations of the logic circuit, but with a reduced test time and cost compared to separately testing each active component or cell and all their possible interactions. Scan paths permit circuit initialization by directly writing to the latches (or registers) and directly observing the contents of the latches (or registers). Using scan paths helps to reduce the quantity of test vectors compared to traditional "functional mode" approaches. Techniques for scanning such data are discussed by E. J. McCluskey in *A Survey of Design for Testability Scan Techniques*, VLSI Design (Vol. 5, No. 12, pp. 38–61, December 1984).

Another solution is the test access port and boundary-scan architecture defined by the IEEE 1149.1 standard, a so-called JTAG test port. IEEE 1149.1 is primarily intended as a system test solution. The IEEE 1149.1 standard requires a minimum of four package pins to be dedicated to the test function. The IEEE 1149.1 standard requires boundary scan cells for each I/O buffer, which adds data delay to all normal operation function pins as well as silicon overhead. Although it has "hooks" for controlling some internal testability schemes, it is not optimized for chip-level testing. IEEE 1149.1 does not explicitly support testing of internal DC parametrics.

Software breakpoints (SWBP) provide another mechanism to allow the debug of microprocessor code and to evaluate performance. A SWBP is typically accomplished through opcode replacement, provided the program resides in a writable memory module which allows the opcode at the stop point to be replaced in memory with the software breakpoint opcode. In most machines, when a SWBP opcode reaches the first execute stage of an instruction execution pipeline, it causes the pipeline to stop advancing or trap to an interrupt service routine, and set a debug status bit indicating the pipeline has stopped or trapped. In processors classified as protected pipelines, instructions fetched into the pipeline after the SWBP are not executed. Instructions that are already in the pipeline are allowed to complete. To restart execution the pipeline can be cleared and then restarted by simply refetching the opcode at the SWBP memory address after the opcode is replaced in memory with the original opcode.

Testing and debugging such a complex pipeline is difficult, even when the techniques described in the preceding paragraphs are used. Aspects of the present invention provide improved methods and apparatus for chip-level testing, as well as system-level debugging.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims. The present invention is directed to improving the performance of processors, such as for example, but not exclusively, digital signal processors.

A digital system is provided with a processor, wherein the processor is operable to execute a sequence of instructions obtained from an instruction bus connected to an instruction memory circuit. The processor has system resources including registers and at least one memory circuit. The processor has condition circuitry for storing at least one condition. There is test port circuitry for receiving test commands from a remote test host. Emulation circuitry for debug events is connected to the test port circuitry, operable to cause the processor to enter a debug suspend state in response to a debug event and to leave the debug suspend state to resume execution of the sequence of instruction in response to a command received by the test port circuitry, wherein execution of the sequence of instructions ceases while the processor is in the debug suspend state. The emulation circuitry is operable to access the system resources in response to an access command received by the test port circuitry if a first condition of the at least one condition is in a first state; however, the emulation circuitry is blocked from accessing the system resources in response to an access command received by the test port circuitry if the first condition is in a second state.

According to another aspect of the present invention, the condition circuitry comprises debug enable mask bit (DBGM) circuitry operable to store either the first state or the second state in response to an instruction executed by the processor from the sequence of instructions.

According to another aspect of the present invention, the condition circuitry comprises high priority interrupt (HPI) circuitry operable to store the second state in response to the first interrupt and further operable to store the first state at the completion of the first ISR.

According to another aspect of the present invention, the processor has debug frame counter (DFC) circuitry operable to store a debug frame number corresponding to a first debug event, wherein the test port circuitry is operable to communicate the frame count number to the external test host. There is debug frame register (DFR) circuitry, operable to store an expected frame count number in response to a command received by the test port circuitry. A first access command received by the test port circuitry is not performed if the frame count number is different from the expected frame count number.

According to another aspect of the present invention, there is memory unit cycle type (MCT) circuitry connected to the emulation circuitry operable to specify a selected access type corresponding to the first condition. The emulation circuitry is operable to access the system resources in response to an access command for the selected access type received by the test port circuitry even if the first condition of the at least one condition is in the second state.

According to another aspect of the present invention, a method is provided for operating a digital system having a processor with system resources including registers and at least one memory circuit, comprising the steps of storing at least one condition within the digital system; receiving an access command from a remote test host; accessing the system resources in response to the access command if a first condition of the at least one condition is in a first state; and blocking access to the system resources in response to the access command if the first condition is in a second state.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the processor of FIG. 1, unless otherwise stated, and in which:

FIG. 9 is a representation of the interrupt enable register of the target device;

FIG. 10 is a representation of the debug interrupt enable register of the target device;

DESCRIPTION OF THE PREFERRED EMBODIMENTS

Figure 1:
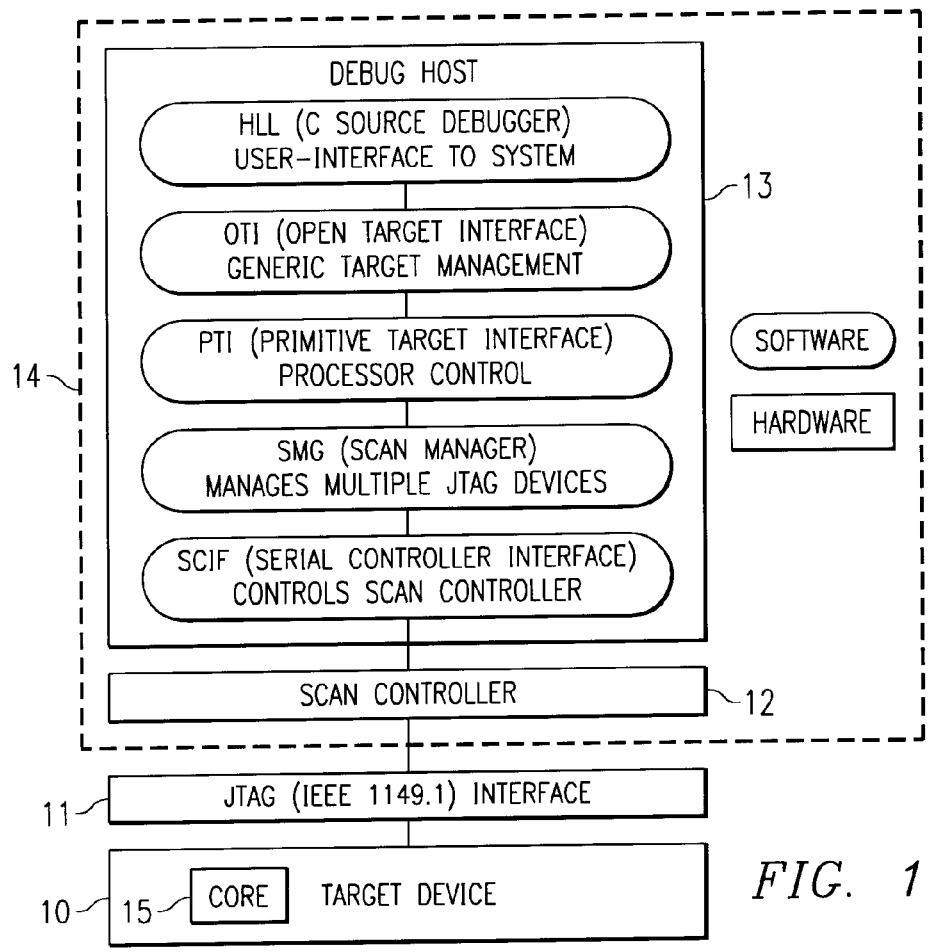
FIG. 1 is a block diagram illustrating an emulation system connected to a target device which embodies aspects of the present invention.

Although the invention finds particular application to Digital Signal Processors (DSPs), implemented, for example, in an Application Specific Integrated Circuit (ASIC), it also finds application to other forms of processors. FIG. 1 is a block diagram of a digital system 10 which has an embodiment of the present invention, and will be described in more detail in later paragraphs. In the interest of clarity, figures herein only show those portions of digital system 10 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. U.S. Pat. No. 5,828,824 issued to Gary Swoboda describes improvements to an emulation system using extended operating modes and is incorporated herein by reference. An embodiment of the present invention is an improvement on the structure of the IEEE 1149.1—1990 *Standard Test Access Port and Boundary Scan Architecture*, which is incorporated herein by reference. Terms and concepts relating to IEEE 1149.1 which are used herein are explained fully in this IEEE standard. Details of portions of digital systems relevant to an embodiment of the present invention are explained in sufficient detail hereinbelow, so as to enable one of ordinary skill in the microprocessor art to make and use the invention.

FIG. 1 is a block diagram illustrating an emulation/debug system 14 connected to a target device 10 which embodies aspects of the present invention. Test host 13 allows high-level debugging actions to be performed by a user. Debug system 14 is connected to a low-level interface 11 supported by target device 10.

Debug Host 13 is a computer, typically a PC, running the user-interface for a target processor debugger. The debug host allows the user to issue high level commands such as "set breakpoint at function main( )" or "examine the contents of memory from 0x0 to 0x100". The source code for the debugger is available from Texas Instruments Incorporated as an Emulator Porting Kit (EPK), for example.

Scan Controller board 12 is attached to the debug host and is connected to the target device via JTAG interface 11. The Scan Controller performs JTAG state sequences sent to it by the Debug Host. Scan controller 12 can be XDS-510, XDS-510PP or XDS-510WS available from Texas Instruments Incorporated, for example.

Target device 10 contains hardware extensions for advanced debugging features. These assist in the user's development of the application system (software and the hardware). Since these capabilities are part of core processor 15, they are available on any device which includes core processor 15, utilizing only the JTAG interface with extended operating mode enhancements, as described in U.S. Pat. No. 5,828,824. They provide simple, inexpensive, and speed independent access to core 15 for sophisticated debugging and economical system development, without requiring the costly cabling and access to processor pins required by traditional emulator systems or intruding on system resources. The on-chip development interface provides:

- Non-intrusive access to internal and external memory.
- Minimally-intrusive access to CPU and peripheral registers.
- Control of the execution of background code while continuing to service real-time interrupts.
- Break on a software breakpoint instruction (instruction replacement).
- Break on a specified program or data access without requiring instruction replacement (accomplished using bus comparators).
- Break on external attention-request from debug host or additional hardware (XDS-524 or logic analyzer or other processor).
- Break after the execution of a single instruction (single-stepping)
- Control over the execution of code from device power-up.
- Non-intrusive determination of device status.
- Detection of a system reset, emulation/test-logic reset, or power-down occurrence.
- Detecting the absence of a system clock or memory-ready signal.
- Checking if global interrupts are enabled.
- Determining why debug accesses might be blocked.
- Rapid transfer of memory contents between the device and a host (data logging).
- Two 40-bit Parallel Signature Analysis registers (PSA) to verify proper CPU operation at speed.
- A 40-bit cycle counter for performance benchmarking. With a 100 MHz cycle clock, this can benchmark actions up to 3 hours in duration.
- Ability to add more debug capabilities through ASIC macros built from gate-array cells.

In an alternative embodiment, to reduce the silicon cost of emulation support hardware, many of the capabilities above can share the same resources such that they could not be performed in parallel.

Figure 2:
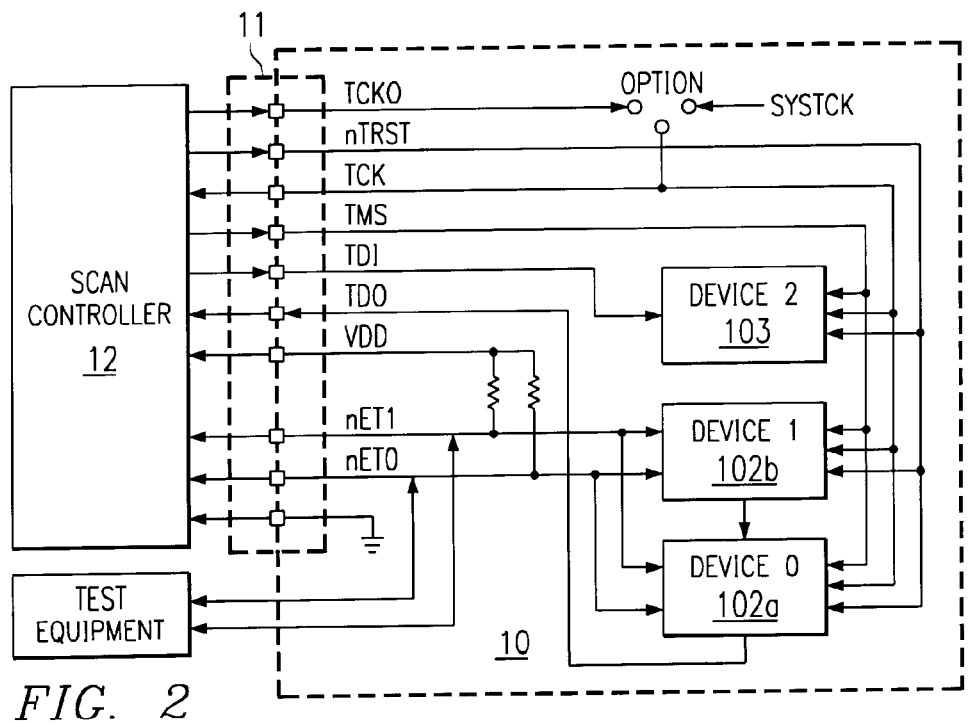
FIG. 2 is a block diagram illustrating an emulation system connected to several modules within the target device of FIG. 1.

The example system in FIG. 2 shows the system connectivity necessary for debug with multiple CPUs in multiple devices. This diagram omits signal buffering and other electrical considerations necessary to create a functional system. In this example, module 102*a* and module 102*b* contain CPU cores while module 103 does not. The three modules share a parallel connection to signals nTRST, TCK, and TMS. The scan path begins at the connector which provide JTAG interface 11 with signal TDI, enters module 103, passes through module 102*b*, and exits module 102*a*, ending as TDO back at the connector. Connections between module 1 and module 0 nET1 and nET0 create trigger channels one and zero.

Scan Controller 12 supplies VDD (Power), GND (Ground), and TCK to the connector. Scan controller 12 accommodates the system generation of (SYSTCK) or scan controller generation (TCKO) of TCK.

The multiprocessing debug environment requires a multi-tasking operating system on Host 13. Using the multi-tasking OS framework allows multiple single processor debuggers to be spawned as separate tasks by a global debugger shell. This creates an environment that allows the user to manipulate each processor individually via the single processor debuggers in individual windows or control processors globally via the global execution control directives which are part of the global debugger shell, as described in U.S. Pat. No. 5,828,824.

The following definitions will help the reader to understand the information in the rest of this application:

- Background code: The body of code that can be halted during debugging because it is not time-critical.
- Foreground code: The code of time-critical interrupt service routines, which are executed even when background code is halted.
- Debug-suspend state: The state in which the device does not execute background code.
- Time-critical interrupt: An interrupt that must be serviced even when background code is halted. For example, a time-critical interrupt might service a motor controller or a high-speed timer.
- Debug event: An action, such as the decoding of a software breakpoint instruction, the occurrence of an analysis breakpoint/watchpoint, or a request from a host processor that can result in special debug behavior, such as halting the device or pulsing one of the signals EMU0 or EMU1.
- Break event: A debug event that causes the device to enter the debug-halt state.

A user of emulation system 14 has the option of selecting two forms of control over target processor 10's execution of code: stop mode and real-time mode. Stop mode halts execution of all code whereas real-time mode allows selected interrupt service routines (ISRs) to be performed while execution of background code is halted. Background code refers to the main body of code which is generally not as time-critical as the interrupt routines which service motor controls or high-speed timers, for example. Real-time mode provides for the debug of code that interacts with interrupts that cannot be disabled. Stop mode provides complete control of program execution, allowing for the disabling all interrupts (including those which are non-maskable) and reset. Both execution modes can suspend program execution at debug events, such as:

- software breakpoint instructions
- specified program or data accesses (i.e. analysis breakpoints or watchpoints)
- when test host 13 or external hardware requests it Real-time Debug Mode Real-time debug allows for the suspension of background program execution at break events while continuing to service time-critical interrupts (also referred to as foreground code). Program execution can actually be suspended in multiple locations—under certain circumstances it is advantageous to break within one time critical interrupt service routine while still allowing others to be serviced.

The suspension of execution is similar to the execution of an IDLE instruction. An instruction pipeline within target device 10 flushes as instruction decode stops and all current pipeline activity completes. Interrupts can restart execution, but after the interrupt service routine is complete, the device returns to the suspended state (this differs from IDLE—after servicing an interrupt the device does not typically return to the IDLE state). When suspended, a debug interrupt enable register (DBGIER) is used in addition to a standard interrupt enable register (IER) to qualify pending interrupts. Interrupts must be enabled by both masks to interrupt the CPU when it is suspended, however, a global interrupt enable flag (INTM) is ignored. Suspending execution will add only one cycle to interrupt latency.

The DBGIER register serves to indicate what interrupts are time-critical. When a time-critical hardware interrupt is taken, a high priority interrupt active bit (HPI) in debug status register (DBGSTAT) is enabled (it's previous value is saved on the stack in the status word DBGSTAT). HPI will be cleared when the last time-critical interrupt service routine completes and it's previous DBGSTAT is popped off the stack. HPI is used to indicate whether certain break events should be performed. Note that HPI will be set whenever an interrupt enabled in the DBGIER register is taken—not just when execution was suspended. It will not be set by an INTR instruction which corresponds to an interrupt set in DBGIER.

Stop Mode Execution Control

Stop mode causes break events to suspend program execution at the next interrupt boundary, which is generally identical to the next instruction boundary. When execution is suspended, all interrupts (including reset and non-maskable interrupts) are ignored until the CPU receives a debug run directive. Stop mode can be thought of as similar to real-time mode, except that no interrupts are considered time-critical (i.e., all code is background code). Should an interrupt occur simultaneously with a debug event, the debug event has priority. However, once the processing of an interrupt has begun, target device 10 can not process a debug event until the first instruction boundary following one of these events.

Figure 3:
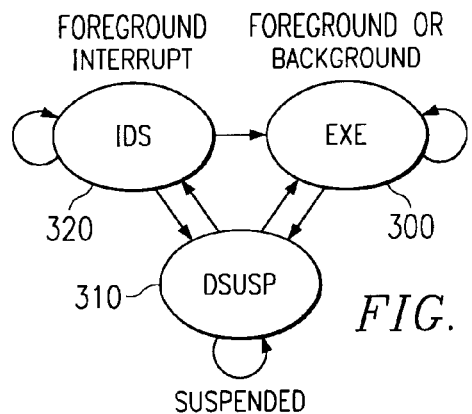
FIG. 3 is a state diagram illustrating real-time mode execution states.

FIG. 3 is a state diagram illustrating real-time mode execution states. There are three or more execution real-time execution states. These states are implemented by an Execute State Machine (ESM) within emulation circuitry of core processor 15. For this embodiment, there are three states defined: Execute (EXE) 300, Debug Suspend (DSUSP) 310, and Interrupt During Debug Suspend (IDS) 320. EXE state 300 represents code being executed on target device 10 with no outstanding stop conditions.

Two of these states, execute 300 and debug suspend 310, are also used when in stop mode. IDS 320 cannot be entered from DSUSP state 310 during stop mode debug.

Figure 4:
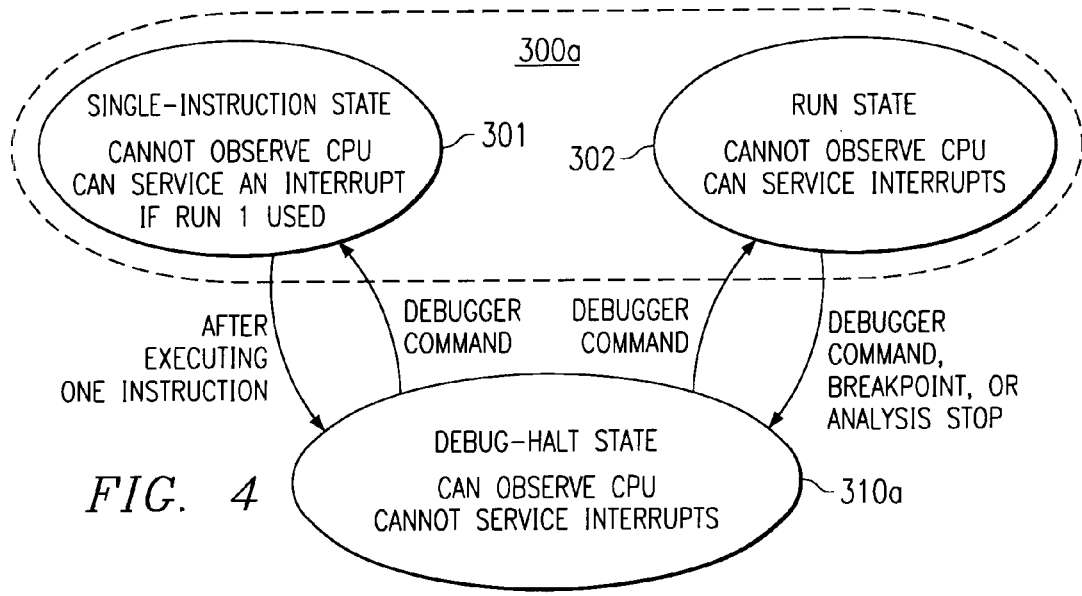
FIG. 4 is a state diagram illustrating stop mode execution states.

FIG. 4 illustrates the relationship among two states that are included within EXE state 300a: single step state 301 and run state 302. Stop mode causes break events, such as software breakpoints and analysis watchpoints, to suspend program execution at the next interrupt boundary (which is usually identical to the next instruction boundary). When execution is suspended, all interrupts (including NMI and RS) are ignored until the CPU receives a directive to run code again. In stop mode, the CPU can operate in the following execution states:

Debug-halt state 310a. This state is entered through a break event, such as the decoding of a software breakpoint instruction or the occurrence of an analysis breakpoint/watchpoint. This state can also be entered by a request from the host processor. In the stop mode debug-halt state, the CPU is halted. A user can place the device into one of the other two states by giving the appropriate command to the debugger.

The CPU cannot service any interrupts, including NMI and RS (reset). When multiple instances of the same interrupt occurs without the first instance being serviced, the later instances are lost.

Single-instruction state 301. This state is entered when a user tells the debugger to execute a single instruction by using a RUN 1 command or a STEP 1 command. The CPU executes the single instruction pointed to by the PC and then returns to the debug-halt state (it executes from one interrupt boundary to the next). The CPU is only in the single-instruction state until that single instruction is done.

If an interrupt occurs in this state, the command used to enter this state determines whether that interrupt can be serviced. If a RUN 1 command was used, the CPU can service the interrupt. If a STEP 1 command was used, the CPU cannot, even if the interrupt is NMI or RS.

Run state 302. This state is entered when a user uses a run command from the debugger interface. The CPU executes instructions until a debugger command or a debug event returns the CPU to the debug-halt state.

The CPU can service all interrupts in this state. When an interrupt occurs simultaneously with a debug event, the debug event has priority; however, if interrupt processing began before the debug event occurred, the debug event cannot be processed until the interrupt service routine begins.

Notice that the processor cannot pass directly between the single-instruction and run states. Notice also that the CPU can be observed only in the debug-halt state. In practical terms, this means the contents of CPU registers and memory are not updated in the debugger display in the single-instruction state or the run state. Maskable interrupts occurring in any state are latched in the interrupt flag register (IFR).

Figure 5:
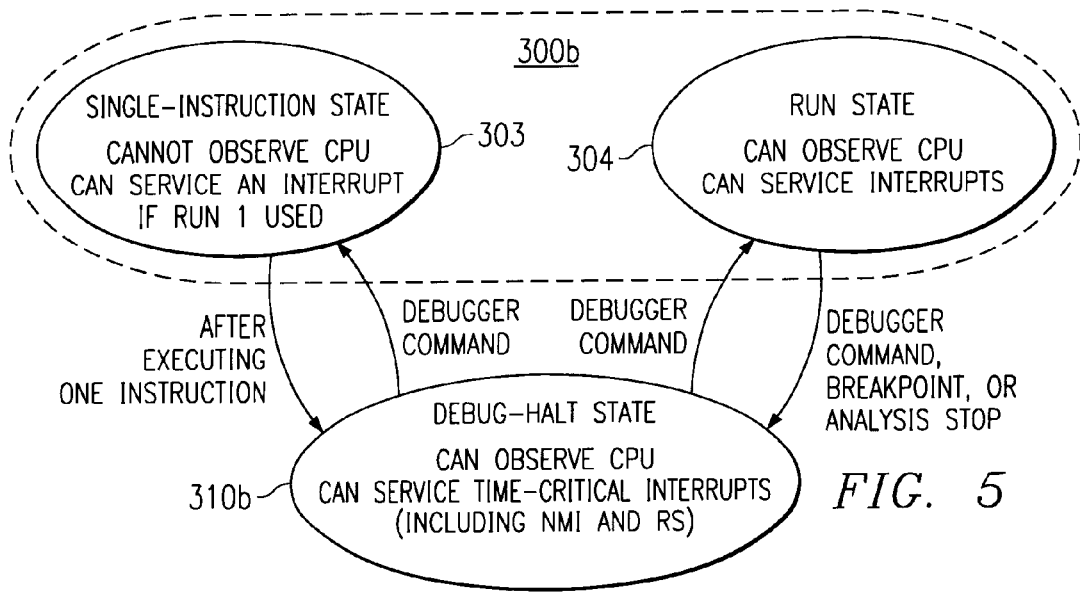
FIG. 5 is a state diagram illustrating real-time mode execution states.

FIG. 5 illustrates the relationship among two states that are included within EXE state 300b: single step state 303 and run state 304. Real-time mode provides for the debugging of code that interacts with interrupts that must not be disabled. Real-time mode allows a user to suspend background code at break events while continuing to execute time-critical interrupt service routines (also referred to as foreground code). In real-time mode, the CPU can operate in the following execution states.

Debug-halt state 310b. This state is entered through a break event such as the decoding of a software breakpoint instruction or the occurrence of an analysis breakpoint/watchpoint. This state can also be enter by a request from the host processor. A user can place the device into one of the other two states by giving the appropriate command to the debugger.

In this state, only time-critical interrupts can be serviced. No other code can be executed. Maskable interrupts are considered time-critical if they are enabled in the debug interrupt enable register (DBGIER). If they are also enabled in the interrupt enable register (IER), they are serviced. The interrupt global mask bit (INTM) is ignored. NMI and RS are also considered time-critical, and are always serviced once requested. It is possible for multiple-interrupts to occur and be serviced while the device is in the debug-halt state.

Suspending execution adds only one cycle to interrupt latency. When the processor returns from a time-critical ISR, it reenters the debug-halt state.

If a CPU reset occurs (initiated by RS), the device runs the corresponding interrupt service routine until that routine clears the debug enable mask bit (DBGM) in status register ST1. When a reset occurs, DBGM is set, disabling debug events. To re-enable debug events, the interrupt service routine must clear DBGM. Only then will the outstanding emulation-suspend condition be recognized.

Note: Should a time-critical interrupt occur in real-time mode at the precise moment that the debugger receives a RUN command, the time-critical interrupt will be taken and serviced in its entirety before the CPU changes states.

Single-instruction state 303. This state is entered when a user tells the debugger to execute a single instruction by using a RUN 1 command or a STEP 1 command. The CPU executes the single instruction pointed to by the PC and then returns to the debug-halt state (it executes from one interrupt boundary to the next).

If an interrupt occurs in this state, the command used to enter this state determines whether that interrupt can be serviced. If a RUN 1 command was used, the CPU can service the interrupt. If a STEP 1 command was used, the CPU cannot, even if the interrupt is NMI or RS. In real-time mode, if the DBGM bit is 1 (debug events are disabled), a RUN 1 or STEP 1 command forces continuous execution of instructions until DBGM is cleared.

Note: If a user single-steps an instruction in real-time emulation mode and that instruction sets DBGM, the CPU continues to execute instructions until DBGM is cleared. If a user wants to single-step through a non-time-critical interrupt service routine (ISR), a user must initiate a CLRC DBGM instruction at the beginning of the ISR. Once DBGM is cleared, a user can single-step or place breakpoints.

Run state 304. This state is entered when a user uses a run command from the debugger interface. The CPU executes instructions until a debugger command or a debug event returns the CPU to the debug-halt state.

The CPU can service all interrupts in this state. When an interrupt occurs simultaneously with a debug event, the debug event has priority; however, if interrupt processing began before the debug event occurred, the debug event cannot be processed until the interrupt service routine begins.

Notice that the processor cannot pass directly between the single-instruction and run states. Notice also that the CPU can be observed in the debug-halt state and in the run state. In the single-instruction state, the contents of CPU registers and memory are not updated in the debugger display. In the debug-halt and run states, register and memory values are updated unless DBGM=1. Maskable interrupts occurring in any state are latched in the interrupt flag register (IFR).

Caution about breakpoints within time-critical interrupt service routines:

Do not use breakpoints within time-critical interrupt service routines. They will cause the device to enter the debug-halt state, just as if the breakpoint were located in normal code. Once in the debug-halt state, the CPU services requests for RS, NMI, and those interrupts enabled in the DBGIER and the IER.

After approving a maskable interrupt, the CPU disables the interrupt in the IER. This prevents subsequent occurrences of the interrupt from being serviced until the IER is restored by a return from interrupt (IRET) instruction or until the interrupt is deliberately re-enabled in the interrupt service routine (ISR). Do not re-enable that interrupt's IER bit while using breakpoints within the ISR. If a user does so and the interrupt is triggered again, the CPU performs a new context save and restarts the interrupt service routine.

Figure 6:
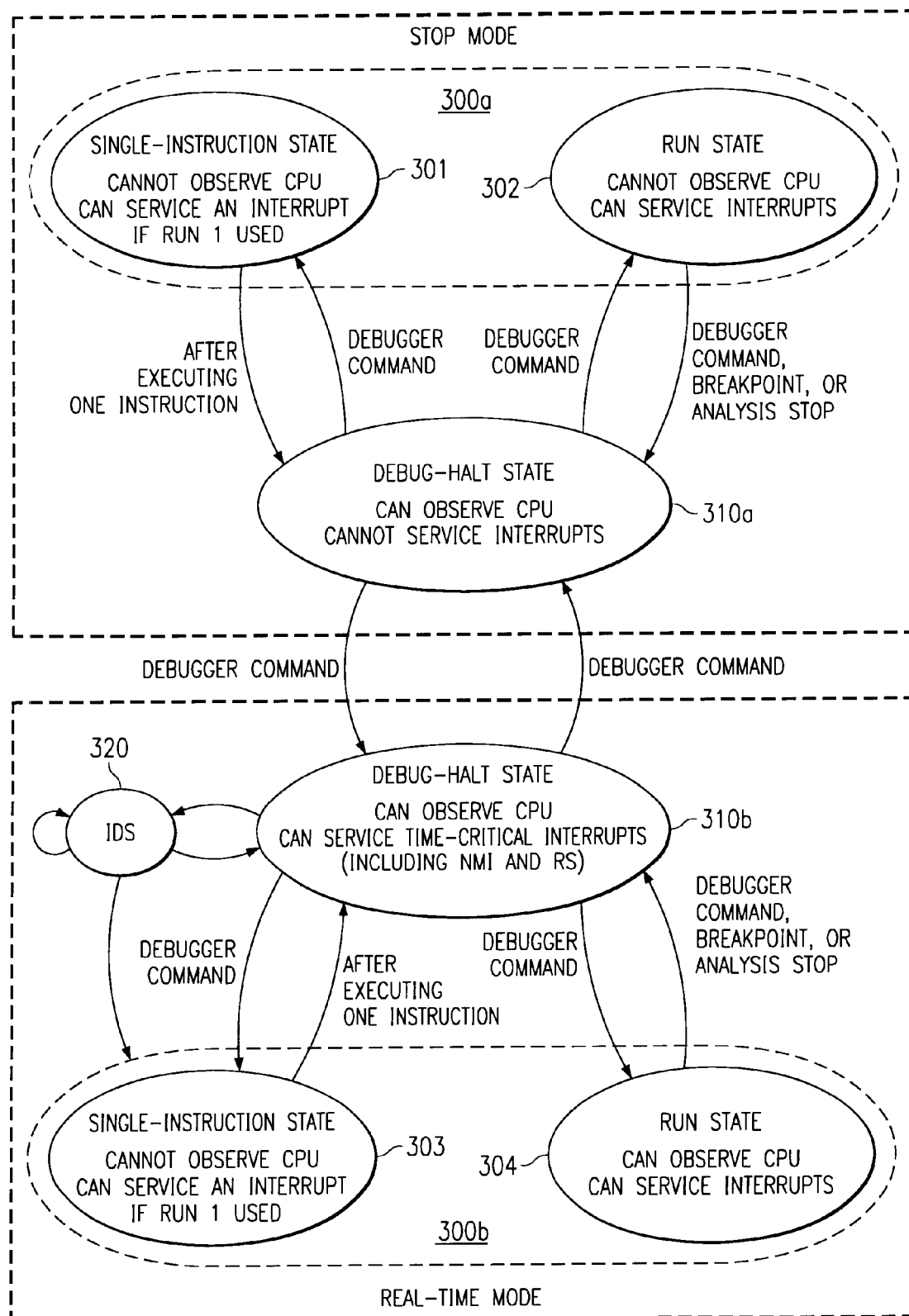
FIG. 6 is a state diagram illustrating the combined state machines of FIG. 3 through FIG. 5.

FIG. 6 is a graphical summary of the differences between the execution states of stop mode and real-time mode. Table 1 is a summary of how interrupts are handled in each of the states of stop mode and real-time mode.

TABLE 1

Interrupt Handling Information By Mode and State

| Mode | State | If This Interrupt Occurs ... | The Interrupt Is ... |
|---|---|---|---|
| Stop | Debug-halt | RS | Not serviced |
| | | NMI | Not serviced |
| | | Maskable interrupt | Latched in IFR but not serviced |
| | Single-instruction | RS | If running: Serviced |
| | | | If stepping: Not serviced |
| | | NMI | If running: Serviced |
| | | | If stepping: Not serviced |
| | | Maskable interrupt | If running: Serviced |
| | | | If stepping: Latched in IFR but not serviced |
| | Run | RS | Serviced |
| | | NMI | Serviced |
| | | Maskable interrupt | Serviced |
| Real-time | Debug-halt | RS | Serviced |
| | | NMI | Serviced |
| | | Maskable interrupt | If time-critical: Serviced. If not time-critical: Latched in IFR But not serviced |
| | Single-instruction | RS | If running: Serviced |
| | | | If stepping: Not serviced |
| | | NMI | If running: Serviced |
| | | | If stepping: Not serviced |
| | | Maskable interrupt | If running: Serviced |
| | | | If stepping: Latched in IFR but not serviced |
| | Run | RS | Serviced |
| | | NMI | Serviced |
| | | Maskable interrupt | Serviced |

Note: Unless a real-time operating system is being used, the real-time operating system interrupt (RTOSINT) should not be enabled. RTOSINT is completely disabled when bit 15 in the IER is 0 and bit 15 in the DBGIER is 0.

Generally, a program uses the IRET instruction to return from an interrupt. The IRET instruction restores all the values that were saved to the stack during the automatic context save. In restoring status register-ST1 and the debug status register (DBGSTAT), IRET restores the debug context that was present before the interrupt.

In some target applications, an application might have interrupts that must not be returned from by the IRET instruction. Not using IRET can cause a problem for the emulation logic, because the emulation logic assumes the original debug context will be restored. The abort interrupt (ABORTI) instruction is provided as a means to indicate that the debug context will not be restored and the debug logic needs to be reset to its default state. As part of its operation, the ABORTI instruction:

Sets the DBGM bit in, ST1. This disables debug events.

Modifies select bits in, DBGSTAT. The effect is a resetting of the debug context. If the CPU was in the debug-halt state before the interrupt occurred, the CPU does not halt when the interrupt is aborted. The CPU automatically switches to the run state. If a user want to abort an interrupt, but keep the CPU halted, insert a breakpoint after the ABORTI instruction.

The ABORTI instruction does not modify the DBGIER, the IER, the INTM bit, or any analysis registers (for example, registers used for breakpoints, watchpoints, and data logging).

Real-time and Stop Mode Execution State Machine Transitions

A low logic level applied to the nTRST terminal or a software directive requesting functional run forces the execution state to EXE 300. This state directs the pipeline to fetch and execute instructions and process interrupts in a normal way. Real-time debug allows the suspension of program execution at points defined by breakpoints, watchpoints, and debug software directives, provided the application defines these points within an allowable stopping window in a software program to be debugged.

Processing a debug event occurs during an allowable stopping window, i.e., when all the following conditions are met:

A debug event is present;

The instruction decode is at an instruction boundary;

Execution State Machine state is EXE;

Reset and non-maskable interrupt (NMI) are not active;

The execute command is not functional run;

DBGM bit enables debug exceptions; and

INT disables interrupts or a high priority (HP) interrupt request is not active.

Debug request processing causes program execution to suspend at an instruction boundary and the execution state machine state changes from EXE state 300 to DSUSP state 310. When any of the debug above conditions are not met, the execution state remains EXE and no debug event processing occurs. The debug architecture permits debug event processing in the delayed slots of delayed instructions.

Debug events occurring outside the stopping window create a debug pending condition. This condition suspends program execution when the application enables debug interrupts by opening the stopping window.

DSUSP state 310 indicates instruction execution is inactive. Both the IDS and EXE states can generate entry into the DSUSP state and the DSUSP state generates entry into both the IDS and EXE states. Interrupt processing causes exit to the IDS state while debug software initiated execute directives cause exit to the EXE state.

High Priority (HP) interrupt processing refers to real-time, time critical interrupts. DSUSP state 310 enables HP interrupts independent of the value of INT or software run directives. An interrupt pipeline jam for an HP interrupt occurs in response to an interrupt by selecting an interrupt decode input on mux 411, see FIG. 7. Concurrently, the execution state is moved to IDS 320. This jam also causes an extra word to be pushed on the stack. This word contains debug status describing the reason the DSUSP state entry occurred. This word is the repeat counter with additional register bits associated for holding additional program counter and the debug status. When a debug event causing the DSUSP state occurs within a delayed slots of delayed branch and call instruction, this value contains the program counter value generated by the delayed branch or call along with debug status information. When a debug event occurs outside a delay slot, the value contains the repeat counter value and the debug status information.

The presence of a run directive creates a slightly more complicated scenario. A run directive enables low priority (LP) interrupt requests and initiates fetching instructions. A run directive allows interrupts while the pipeline refills as the program counter does not advance while the pipeline refill progresses. This minimizes the interrupt latency at all times and allows back to back interrupts. An HP interrupt request or NMI can occur at any time after the run directive. An LP interrupt request can be processed after the run directive provided the INT enable bit is true.

One of four scenarios unfold after the run directive:
1) A reset is processed;
2) An HP (foreground) interrupt is processed;
3) An LP (background) interrupt is processed as a result of the run or step directive, or;
4) The instruction referenced by the initial program counter begins execution by passing into the decode stage of the pipeline that is irrevocable.

Processing an HP interrupt causes the execution state to change to IDS. The IDS state differs from the EXE state in that the interrupt processing creates a thread, linking the execution to the DSUSP state.

Processing reset, an LP interrupt, or the irrevocable decode of the instruction fetch while in the IDS state moves the execution state to EXE. Execution state changes occur on the same clock the pipeline reset, interrupt jam, or instruction decode occurs. As described before, a tag identifies the interrupt request as HP or LP. This tag allows the interrupt jam to set the appropriate execute state. This generally occurs before the generation of the interrupt vector read address.

Debug Suspend State

When processor core 15 is in debug suspend state 310, it is not executing background code (when debugging in stop mode, all code is considered background code). Actions such as decoding a software breakpoint instruction, the occurrence of an analysis breakpoint/watchpoint, or at the request of the host are referred to as debug events. When a debug event causes the device to enter the debug state, it is also referred to as a break event. Analysis breakpoint/watchpoints and test host requests are referred to as hardware break events, whereas the software break instruction is a software break event. In real-time mode, hardware break events only occur when the debug mode (DBGM) in ST1 is enabled.

The debug mode (DBGM) bit of ST1 is very similar to INTM. It is active low (i.e. a value of 0 indicates that the debug mode is enabled, a value of 1 indicates it is disabled). DBGM is set to 1 on an interrupt. It will be restored on returning from the interrupt. It is initialized to 1 at reset. Unlike INTM, DBGM is also initialized to 1 by ABORTI. It is controlled through the SETC/CLRC instructions. It can be set or cleared in parallel with the INTM bit (this is commonly done).

In the debug state, the program counter (PC) and status bits are held to their values prior to the debug-event. The PC points to the instruction at which the debug-event occurred; that instruction is not considered executed (this is the type of behavior exhibited when taking an interrupt). When execution resumes, that instruction and those following it need to be re-fetched.

If the device is halted in real-time mode and a reset occurs (but not a JTAG Test-Logic-Reset), the device runs from a reset vector until DBGM is enabled, which causes the outstanding emulation suspend condition to be recognized. This is because the emulation logic which tracks this is only initialized by the JTAG Test-Logic-Reset. A debug information visible through ST1 is cleared by the CPU's reset.

Software breakpoint instructions, ESTOP0 and ESTOP1, will cause the device to halt regardless of the setting of the DBGM bit, although it is not recommended that these instructions be used in this manner.

Figures 7, 8:
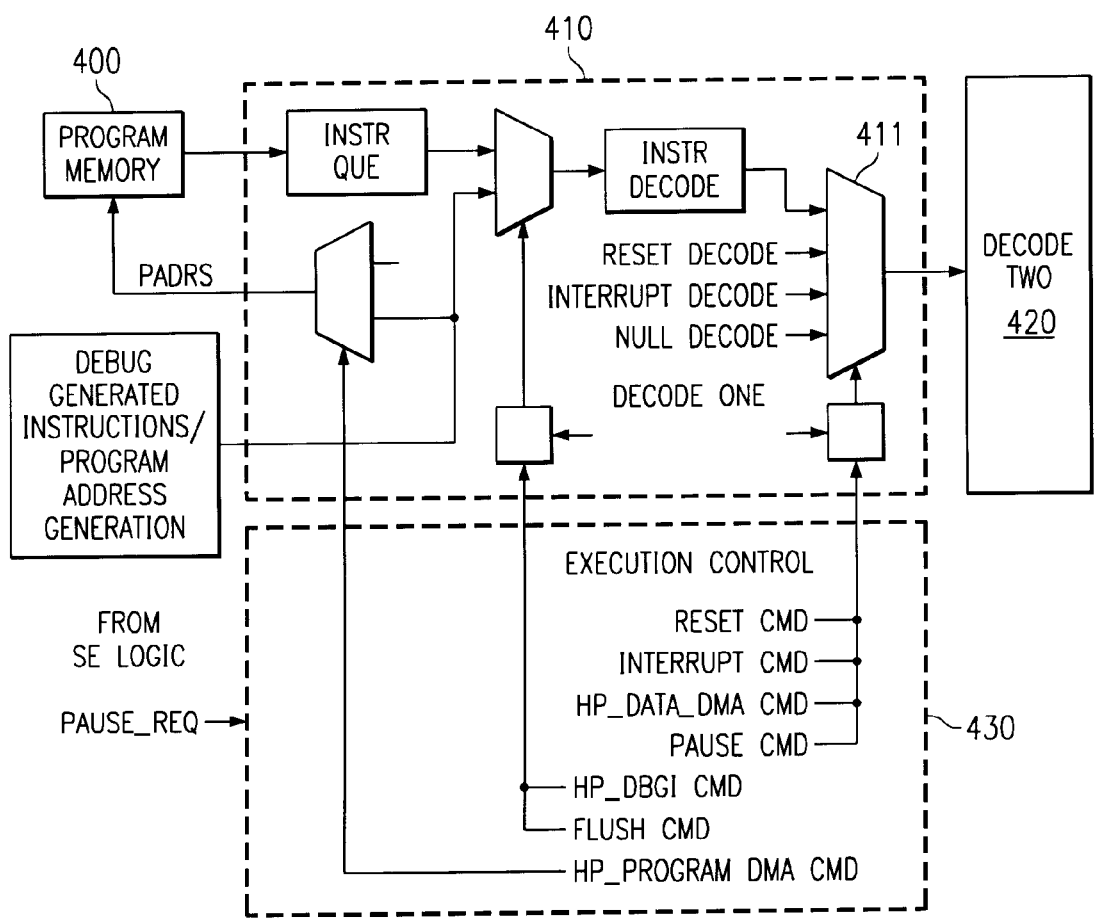
FIG. 7 is a block diagram of the target device of FIG. 1.
FIG. 8 is a representation of the interrupt flag register of the target device.

FIG. 7 is a block diagram of core processor 15 of FIG. 1. Program memory 400 holds instructions which form a software program. A first decode stage 410 in an instruction pipeline receives an instruction from program memory 400 in response to program address bus PADRS. A second decode stage 420 further decodes an instruction after it leaves decode stage 410. Execution Control circuitry 430 is connected to test host 13 to receive debug commands and is connected to decode stage 410 to control execution of core processor 15.

Interrupting the Debug State

Interrupts are hardware- or software-driven signals that cause the processor to suspend its current program sequence and execute a subroutine. Typically, interrupts are generated by hardware devices that need to give data to or take data from the processor (for example, A/D and D/A converters and other processors). Interrupts can also signal that a particular event has taken place (for example, a timer has finished counting).

On the processor, interrupts can be triggered by software (the INTR, OR IFR, or TRAP instruction) or by hardware (a pin, a peripheral, or on-chip logic). If hardware interrupts are triggered at the same time, the processor services them according to a set priority ranking. Each of the processor interrupts, whether hardware or software, can be placed in one of the following two categories:

Maskable interrupts. These are interrupts that can be blocked (masked) or enabled (unmasked) through software.

Non-maskable interrupts. These interrupts cannot be blocked. The processor will immediately approve this type of interrupt and branch to the corresponding subroutine. All software-initiated interrupts are in this category.

The processor handles interrupts in four main phases:

1) Receive the interrupt request. Suspension of the current program sequence must be requested by a software interrupt (from program code) or a hardware interrupt (from a pin or an on-chip device).

2) Approve the interrupt. The processor must approve the interrupt request. If the interrupt is maskable, certain conditions must be met in order for the processor to approve it. For non-maskable hardware interrupts and for software interrupts, approval is immediate.

3) Prepare for the interrupt service routine and save register values. The main tasks performed in this phase are:

Complete execution of the current instruction and flush from the pipeline any instructions that have not reached the decode 2 phase.

Automatically save most of the current program context by s0aving the following registers to the stack: ST0, T, AL, AH, PL, PH, AR0, AR1, DP, ST1, DBGSTAT, and IER.

Fetch the interrupt vector and load it into the program counter (PC).

4) Execute the interrupt service routine. The processor branches to its corresponding subroutine called an interrupt service routine (ISR). The processor branches to the address (vector) that was stored at a predetermined vector location and executes the corresponding ISR.

The processor of FIG. 7 supports 32 interrupt vectors, including the reset vector. Each vector is a 22-bit address that is the start address for the corresponding interrupt service routine (ISR). Each vector is stored in 32 bits at two consecutive addresses. The location at the lower address holds the 16 least significant bits (LSBs) of the vector. The location at the higher address holds the 6 most significant bits (MSBs) right-justified. When an interrupt is approved, the 22-bit vector is fetched, and the 10 MSBs at the higher address are ignored.

Table 2 lists the available interrupt vectors and their locations. The addresses are shown in hexadecimal form. The table also shows the priority of each of the hardware interrupts.

TABLE 2

Interrupt Vectors and Priorities

| Vector | Absolute Address (hexadecimal) VMAP = 0 | VMAP = 1 | Hardware Priority | Description |
|---|---|---|---|---|
| RESET | 00 0000 | 3F FFC0 | 1 (highest) | Reset |
| INT1 | 00 0002 | 3F FFC2 | 5 | Maskable interrupt 1 |
| INT2 | 00 0004 | 3F FFC4 | 6 | Maskable interrupt 2 |
| INT3 | 00 0006 | 3F FFC6 | 7 | Maskable interrupt 3 |
| INT4 | 00 0008 | 3F FFC8 | 8 | Maskable interrupt 4 |
| INT5 | 00 000A | 3F FFCA | 9 | Maskable interrupt 5 |
| INT6 | 00 000C | 3F FFCC | 10 | Maskable interrupt 6 |
| INT7 | 00 000E | 3F FFCE | 11 | Maskable interrupt 7 |
| INT8 | 00 0010 | 3F FFD0 | 12 | Maskable interrupt 8 |
| INT9 | 00 0012 | 3F FFD2 | 13 | Maskable interrupt 9 |
| INT10 | 00 0014 | 3F FFD4 | 14 | Maskable interrupt 10 |
| INT11 | 00 0016 | 3F FFD6 | 15 | Maskable interrupt 11 |
| INT12 | 00 0018 | 3F FFD8 | 16 | Maskable interrupt 12 |
| INT13 | 00 001A | 3F FFDA | 17 | Maskable interrupt 13 |
| INT14 | 00 001C | 3F FFDC | 18 | Maskable interrupt 14 |
| DLOGINT* | 00 001E | 3F FFDE | 19 (lowest) | Maskable data log interrupt |
| RTOSINT* | 00 0020 | 3F FFE0 | 4 | Maskable real-time operating system interrupt |
| Reserved | 00 0022 | 3F FFE2 | 2 | Reserved |
| NMI | 00 0024 | 3F FFE4 | 3 | Non-maskable interrupt |
| ILLEGAL | 00 0026 | 3F FFE6 | — | Illegal-instruction trap |
| USER1 | 00 0028 | 3F FFE8 | — | User-defined software interrupt |
| USER2 | 00 002A | 3F FFEA | — | User-defined software interrupt |
| USER3 | 00 002C | 3F FFEC | — | User-defined software interrupt |
| USER4 | 00 002E | 3F FFEE | — | User-defined software interrupt |
| USER5 | 00 0030 | 3F FFF0 | — | User-defined software interrupt |
| USER6 | 00 0032 | 3F FFF2 | — | User-defined software interrupt |
| USER7 | 00 0034 | 3F FFF4 | — | User-defined software interrupt |
| USER8 | 00 0036 | 3F FFF6 | — | User-defined software interrupt |
| USER9 | 00 0038 | 3F FFF8 | — | User-defined software interrupt |
| USER10 | 00 003A | 3F FFFA | — | User-defined software interrupt |
| USER11 | 00 003C | 3F FFFC | — | User-defined software interrupt |
| USER12 | 00 003E | 3F FFFE | — | User-defined software interrupt |

*Interrupts DLOGINT and RTOSINT are generated by the emulation logic internal to the core.

INT1–INT14 are 14 general-purpose interrupts. DLOGINT (the data log interrupt) and RTOSINT (the real-time operating system interrupt) are available for emulation purposes. These interrupts are supported by three dedicated registers: the interrupt flag register (IFR), the interrupt enable register (IER), and the debug interrupt enable register (DBGIER).

The 16-bit IFR contains flag bits that indicate which of the corresponding interrupts are pending (waiting for approval from the CPU). The external input lines INT1–INT14 are sampled at every CPU clock cycle. If an interrupt signal is recognized, the corresponding bit in the IFR is set and latched. For DLOGINT or RTOSINT, a signal sent by the core's on-chip analysis logic causes the corresponding flag bit to be set and latched. A user can set one or more of the IFR bits at the same time by using the OR IFR instruction.

The interrupt enable register (IER) and the debug interrupt enable register (DBGIER) each contain bits for individually enabling or disabling the maskable interrupts. To enable one of the interrupts in the IER, set the corresponding bit in the IER; to enable the same interrupt in the DBGIER, set the corresponding bit in the DBGIER. The DBGIER indicates which interrupts can be serviced when the core is in the real-time emulation mode.

The maskable interrupts also share bit 0 in status register ST1. This bit, the interrupt global mask bit (INTM), is used to globally enable or globally disable these interrupts. When INTM=0, these interrupts are globally enabled. When INTM=1, these interrupts are globally disabled. A user can set and clear INTM with the SETC INTM and CLRC INTM instructions, respectively.

After a flag has been latched in the IFR, the corresponding interrupt is not serviced until it is appropriately enabled by two of the following: the IER, the DBGIER, and the INTM bit. As shown in Table 3, the requirements for enabling the maskable interrupts depend on the interrupt-handling process used. In the standard process, which occurs in most circumstances, the DBGIER is ignored. When the processor is in real-time emulation mode and the CPU is halted, a different process is used. In this special case, the DBGIER is used and the INTM bit is ignored. (If the DSP is in real-time mode and the CPU is running, the standard interrupt-handling process applies.)

Once an interrupt has been requested and properly enabled, the CPU prepares for and then executes the corresponding interrupt service routine.

TABLE 3

Requirements for Enabling a Maskable Interrupt

| Interrupt-Handling Process | Interrupt Enabled If ... |
| --- | --- |
| Standard | INTM = 0 and bit in IER is 1 |
| DSP in real-time mode and CPU halted | Bit in IER is 1 and bit in DBGIER is 1 |

As an example of varying interrupt-enable requirements, suppose a user wants interrupt INT5 enabled. This corresponds to bit 4 in the IER and bit 4 in the DBGIER. Usually, INT5 is enabled if INTM=0 and IER(4)=1. In real-time emulation mode with the CPU halted, INT5 is enabled if IER(4)=1 and DBGIER(4)=1.

FIG. 8 shows the IFR. If a maskable interrupt is pending (waiting for approval from the CPU), the corresponding IFR bit is 1; otherwise, the IFR bit is 0. To identify pending interrupts, use the PUSH IFR instruction and then test the value on the stack. Use the OR IFR instruction to set IFR bits, and use the AND IFR instruction to clear pending interrupts. When a hardware interrupt is serviced, or when an INTR instruction is executed, the corresponding IFR bit is cleared. All pending interrupts are cleared by the AND IFR, #0 instruction or by a hardware reset.

Notes: When an interrupt is requested by the TRAP instructions, if the corresponding IFR bit is set, the CPU does not clear it automatically. If an application requires that the IFR bit be cleared, the bit must be cleared in the interrupt service routine.

Bits 15 and 14 of the IFR correspond to the interrupts RTOSINT and DLOGINT, as described in Table 4. IFR bits INT1–INT14, are also described in Table 4.

TABLE 4

Interrupt Flag Register, IFR,

| RTOSINT | Real-time operating system interrupt flag | |
| --- | --- | --- |
| Bit 15 | RTOSING = 0 | RTOSINT is not pending |
| | RTOSINT = 1 | RTOSINT is pending |
| DLOGINT | Data log interrupt flag | |
| Bit 14 | DLOGINT = 0 | DLOGINT is not pending |
| | DLOGINT - 1 | DLOGINT is pending |
| INTx | Interrupt x flag (x = 1, 2, 3, . . . , or 14) | |
| Bit (x − 1) | INTx = 0 | INTx is not pending. |
| | INTx = 1 | INTx is pending. |

FIG. 9 shows the IER. To enable an interrupt, set its corresponding bit to 1. To disable an interrupt, clear its corresponding bit to 0. Two syntaxes of the MOV instruction allow a user to read from the IER and write to the IER. In addition, the OR IER instruction enables a user to set IER bits, and the AND IER instruction enables a user to clear IER bits. When a hardware interrupt is serviced, or when an INTR instruction is executed, the corresponding IER bit is cleared. At reset, all the IER bits are cleared to 0, disabling all the corresponding interrupts.

Note: When an interrupt is requested by the TRAP instruction, if the corresponding IER bit is set, the CPU does not clear it automatically. If an application requires that the IER bit be cleared, the bit must be cleared in the interrupt service routine.

Note: When using the AND IER and OR IER instructions, make sure that they do not modify the state of bit 15 (RTOSINT) unless a real-time operating system is present.

Bits 15 and 14 of the IER enable or disable the interrupts RTOSINT and DLOGINT, as described in Table 5. IER bits INT1–INT14, are also described in Table 5.

TABLE 5

Interrupt Enable Register, IER

| RTOSINT | Real-time operating system interrupt enable bit | |
| --- | --- | --- |
| Bit 15 | RTOSINT = 0 | RTOSINT is disabled. |
| | RTOSINT = 1 | RTOSINT is enabled. |
| DLOGINT | Data log interrupt enable bit | |
| Bit 14 | DLOGINT = 0 | DLOGINT is disabled. |
| | DLOGINT = 1 | DLOGINT is enabled. |
| INTx | Interrupt x enable bit (x = 1, 2, 3, . . . , or 14) | |
| Bit (x − 1) | INTx = 0 | INTx is disabled. |
| | INTx = 1 | INTx is enabled. |

FIG. 10 shows the DBGIER, which is used only when the CPU is halted in real-time emulation mode. An interrupt enabled in the DBGIER is defined as a time-critical interrupt. When the CPU is halted in real-time mode, the only interrupts that are serviced are time-critical interrupts that are also enabled in the IER. If the CPU is running in real-time emulation mode, the standard interrupt-hahdling process is used and the DBGIER is ignored.

As with the IER, a user can read the DBGIER to identify enabled or disabled interrupts and write to the DBGIER to enable or disable interrupts. To enable an interrupt, set its corresponding bit to 1. To disable an interrupt, set its corresponding bit to 0. Use the PUSH DBGIER instruction to read from the DBGIER and the POP DBGIER instruction to write to the DBGIER. At reset, all the DBGIER bits are set to 0.

Bits 15 and 14 of the DBGIER enable or disable the interrupts RTOSINT and DLOGINT, as described in Table 6. DBGIER bits INT1–INT14, are also described in Table 6.

TABLE 6

Debug Interrupt Enable Register, DBGIER,

| | | |
|---|---|---|
| RTOSINT | Real-time operating system interrupt debug enable bit | |
| Bit 15 | RTOSINT = 0 | RTOSINT is disabled. |
| | RTOSINT = 1 | RTOSINT is enabled. |
| DLOGINT | Data log interrupt debug enable bit | |
| Bit 14 | DLOGINT = 0 | DLOGINT is disabled. |
| | DLOGINT = 1 | DLOGINT is enabled. |
| INTx | Interrupt x debug enable bit (x = 1, 2, 3, . . . , or 14) | |
| Bit (x − 1) | INTx = 0 | INTx is disabled. |
| | INTx = 1 | INTx is enabled. |

Figure 11:
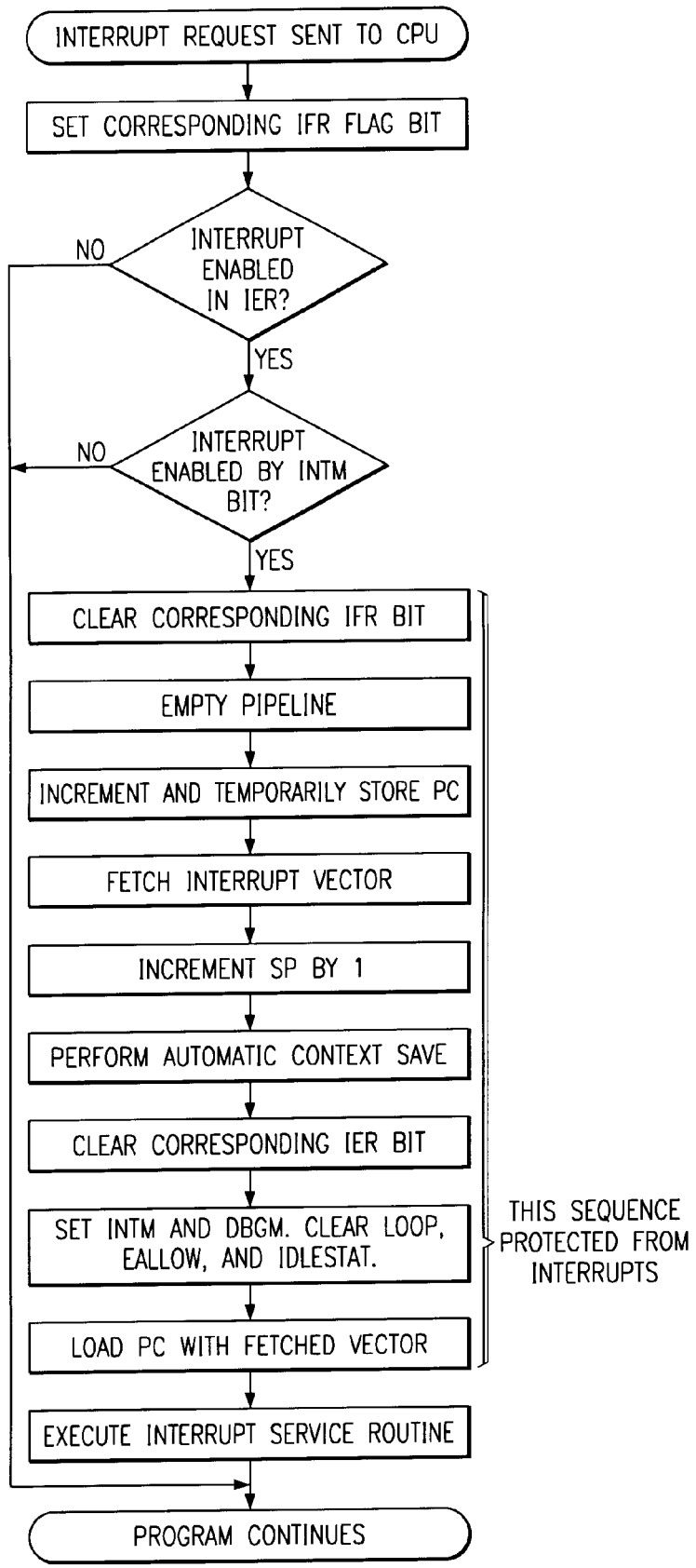
FIG. 11 is a flow chart illustrating processing of a maskable interrupt request.

The flow chart in FIG. 11 shows the standard process for handling interrupts. When more than one interrupt is requested at the same time, the processor services them one after another according to their set priority ranking. See the priorities in Table 2.

FIG. 11 is not meant to be an exact representation of how an interrupt is handled. It is a conceptual model of the important events. What following list explains the steps shown in FIG. 11:

step 1101) Interrupt request sent to CPU. One of the following events occurs:

One of the pins INT1–INT14 is driven low.

The core emulation logic sends to the CPU a signal for DLOGINT or RTOSINT.

One of the interrupts INT1–INT14, DLOGINT, and RTOSINT is initiated by way of the OR IFR instruction.

step 1102) Set corresponding IFR flag bit. When the CPU detects a valid interrupt in step 1, it sets and latches the corresponding flag in the interrupt flag register (IFR). This flag stays latched even if the interrupt is not approved by the CPU in step 1103.

step 1103) Interrupt enabled in IER? Interrupt enabled by INTM bit? The CPU approves the interrupt only if the following conditions are true:

step 1103a: The corresponding bit in the IER is 1.

step 1103b: The INTM bit in ST1 is 0.

Once an interrupt has been enabled and then approved by the CPU, no other interrupts can be serviced until the CPU has begun executing the interrupt service routine for the approved interrupt (step 1113).

step 1104) Clear corresponding IFR bit. Immediately after the interrupt is approved, its IFR bit is cleared. If the interrupt signal is kept low, the IFR register bit will be set again. However, the interrupt is not immediately serviced again. The CPU blocks new hardware interrupts until the interrupt service routine (ISR) begins. In addition, the IER bit is cleared (in step 1110) before the ISR begins; therefore, an interrupt from the same source cannot disturb the ISR until the IER bit is set again by the ISR.

step 1105) Empty the pipeline. The CPU completes any instructions that have reached or passed their decode 2 phase in the instruction pipeline. Any instructions that have not reached this phase are flushed from the pipeline.

step 1106) Increment and temporarily store PC. The PC is incremented by 1 or 2, depending on the size of the current instruction. The result is the return address, which is temporarily saved in an internal hold register. During the automatic context save (step 1109), the return address is pushed onto the stack.

step 1107) Fetch interrupt vector. The PC is filled with the address of the appropriate interrupt vector, and the vector is fetched from that location.

step 1108) Increment SP by 1. The stack pointer (SP) is incremented by 1 in preparation for the automatic context save (step 1109). During the automatic context save, the CPU performs 32-bit accesses, and the core expects 32-bit accesses to be aligned to even addresses by the memory wrapper. Incrementing SP by 1 ensures that the first 32-bit access does not overwrite the previous stack value.

step 1109) Perform automatic context save. A number of register values are saved automatically to the stack. These registers are saved in pairs; each pair is saved in a single 32-bit operation. At the end of each 32-bit save operation, the SP is incremented by 2. Table 7 shows the register pairs and the order in which they are saved. The core expects all 32-bit saves to be even-word aligned by the memory wrapper. As shown in the table, the SP is not affected by this alignment.

TABLE 7

Register Pairs Saved and SP Positions for Context Saves

| | | Bit 0 of Storage Address | |
|---|---|---|---|
| Save Operation[1] | Register Pairs | SP Starts at Odd Address | SP Starts at Even Address |
| 1st | ST0 | 1 ← SP position before step 8<br>0 | 1<br>0 ← SP position before step 8 |
| 2nd | T<br>AL | 1<br>0 | 1<br>0 |
| 3rd | AH<br>PL[2] | 1<br>0 | 1<br>0 |
| 4th | PH<br>AR0 | 1<br>0 | 1<br>0 |
| 5th | AR1<br>ST1 | 1<br>0 | 1<br>0 |
| 6th | DP<br>IER | 1<br>0 | 1<br>0 |
| 7th | DBGSTAT[3]<br>Return address (low half) | 1<br>0 | 1<br>0 |
| | Return address (high half) | 1<br>0 ← SP position after save<br>1 | 1<br>0<br>1 ← SP position after save |

[1]All registers are saved as pairs, as shown.
[2]The P register is saved with 0 shift (CPU ignores current state of the product shift mode bits, PM, in status register 0).
[3]The DBGSTAT register contains special emulation information.

step 1110) Clear corresponding IER bit. After the IER register is saved on the stack in step 1109, the CPU clears the IER bit that corresponds to the interrupt being handled. This prevents reentry into the same interrupt. If an application wants to nest occurrences of the interrupt, have the ISR set that IER bit again.

step 1111) Set INTM and DBGM. Clear LOOP, EALLOW, and IDLESTAT. All these bits are in status register ST1. By setting INTM to 1, the CPU prevents maskable interrupts from disturbing the ISR. If a user wishes to nest interrupts, have the ISR clear the INTM bit. By setting DBGM to 1, the CPU prevents debug events from disturbing time-critical code in the ISR. If the user does not want debug events blocked, have the ISR clear DBGM.

The CPU clears LOOP, EALLOW, and IDLESTAT so that the ISR operates within a new context.

step 1112) Load PC with fetched vector. The PC is loaded with the interrupt vector that was fetched in step 1107. The vector forces program control to the ISR.

step 1113) Execute interrupt service routine. Here is where the CPU executes the program code prepared to handle the interrupt Although a number of register values are saved automatically in step 1110, if the ISR uses other registers, the ISR may need to save the contents of these registers at the beginning of the ISR. These values must then be restored before the return from the ISR.

If a user wants the ISR to inform external hardware that the interrupt is being serviced, the IACK instruction can be to send an interrupt acknowledge signal. The IACK instruction accepts a 16-bit constant as an operand and drives this 16-bit value on the 16 least significant lines of the data-write bus, DWDB(15:0).

step 1114) Program continues. If the interrupt is not approved by the CPU, the interrupt is ignored, and the program continues uninterrupted. If the interrupt is approved, its interrupt service routine is executed and the program continues where it left off (at the return address).

Non-maskable interrupts cannot be blocked by any of the enable bits (the INTM bit, the DBGM bit, and enable bits in the IFR, IER, or DBGIER). The processor immediately approves this type of interrupt and branches to the corresponding interrupt service routine. There is one exception to this rule: When the CPU is halted in stop mode (an emulation mode), no interrupts are serviced.

The processor non-maskable interrupts include:

Software interrupts (the INTR and TRAP instructions).

Hardware interrupt NMI

Illegal-instruction trap

Hardware reset interrupt (RS)

The software interrupt instructions and NMI are described in this section. The illegal-instruction trap and reset are described later.

The INTR instruction can be used to initiate one of the following interrupts by name: INT1–INT14, DLOGINT, RTOSINT and NMI. For example, the interrupt service routine for INT1 can be executed by using the following instruction:

INTR INT1

Once an interrupt is initiated by the INTR instruction, how it is handled depends on which interrupt is specified:

INT1–INT14, DLOGINT, and RTOSINT

These maskable interrupts have corresponding flag bits in the IFR. When a request for one of these interrupts is received at an external pin, the corresponding IFR bit is set and the interrupt must be enabled to be serviced. In contrast, when one of these interrupts is initiated by the INTR instruction, the IFR flag is not set, and the interrupt is serviced regardless of the value of any enable bits. However, in other respects, the INTR instruction and the hardware request are the same. For example, both clear the IFR bit that corresponds to the requested interrupt.

NMI

Because this interrupt is non-maskable, a hardware request at a pin and a software request with the INTR instruction lead to the same events. These events are identical to those that take place during a TRAP instruction.

Figure 12:
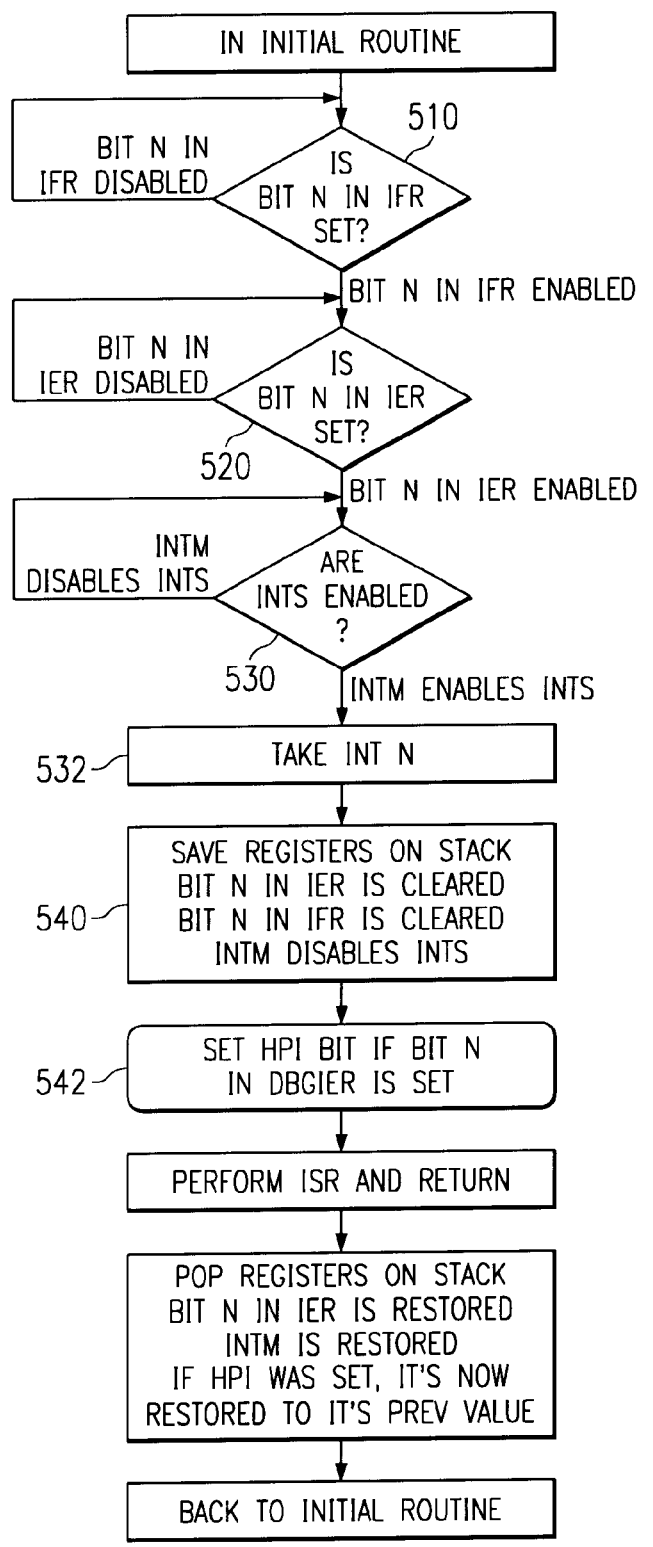
FIG. 12 is a flow chart of interrupt processing while in the execute state.

FIG. 12 is a flow chart of interrupt processing while in the execute state. Step 510 checks that any interrupt, such as interrupt N, is set in the interrupt flag register, (IFR). If so, then step 520 determines if that interrupt is enabled in the interrupt enable register (IER). If so, then step 530 determines if interrupts are globally enabled by checking the INTM bit. If so, step 532 is taken which begins processing an interrupt service routine for interrupt N. Prior to executing instructions, step 540 saves registers on the stack and step 542 sets the HPI bit if a corresponding bit in the debug interrupt enable register (DBGIER) indicates that interrupt N is a high priority interrupt.

In stop mode debug, all interrupts including NMI and RESET are blocked (although latched) while the device is halted in the debug state. Note that in stop mode, when multiple instances of the same interrupts occur without the first instance being serviced, the later interrupts will be lost.

Figure 13:
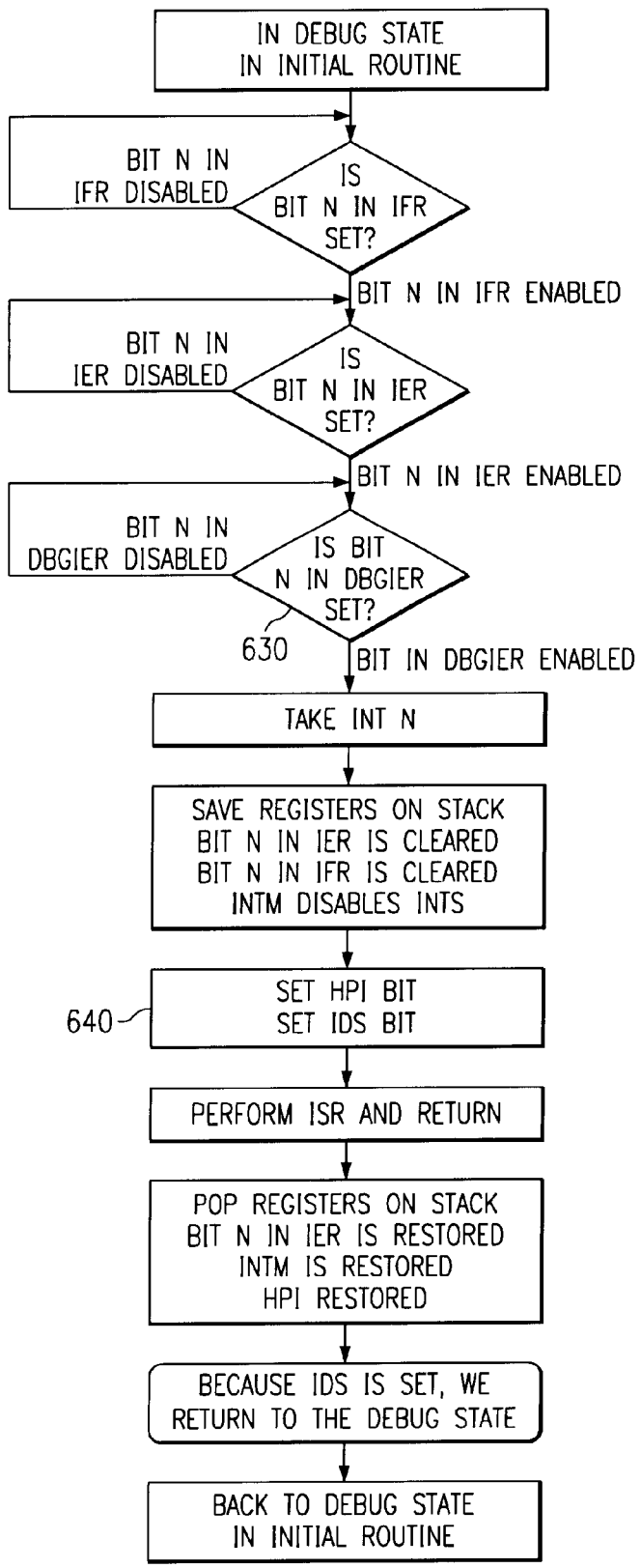
FIG. 13 is a flow chart of interrupt processing while in the debug suspend state.

FIG. 13 is a flow chart of interrupt processing while in the debug suspend state. In real-time mode, should the processor core be in the debug state and be interrupted by a high-priority interrupt, as indicated by a corresponding bit in the debug interrupt enable register (DBGIER) in step 630, then the interrupt during debug state bit (IDS) of Debug Status is set (and HPI will be set) as soon as the interrupt service routine is started in step 640. The value of Debug Status saved on the stack by the context store will not have the IDS or HPI set—rather, those status bits will be set immediately after this. The IDS bit is used to indicate when, upon returning from an interrupt, processor core 15 should re-enter the debug state. Upon returning from the interrupt, the PC and status will return to their state before the interrupt (unless the interrupt service routine purposely modified their values on the stack).

Figure 14:
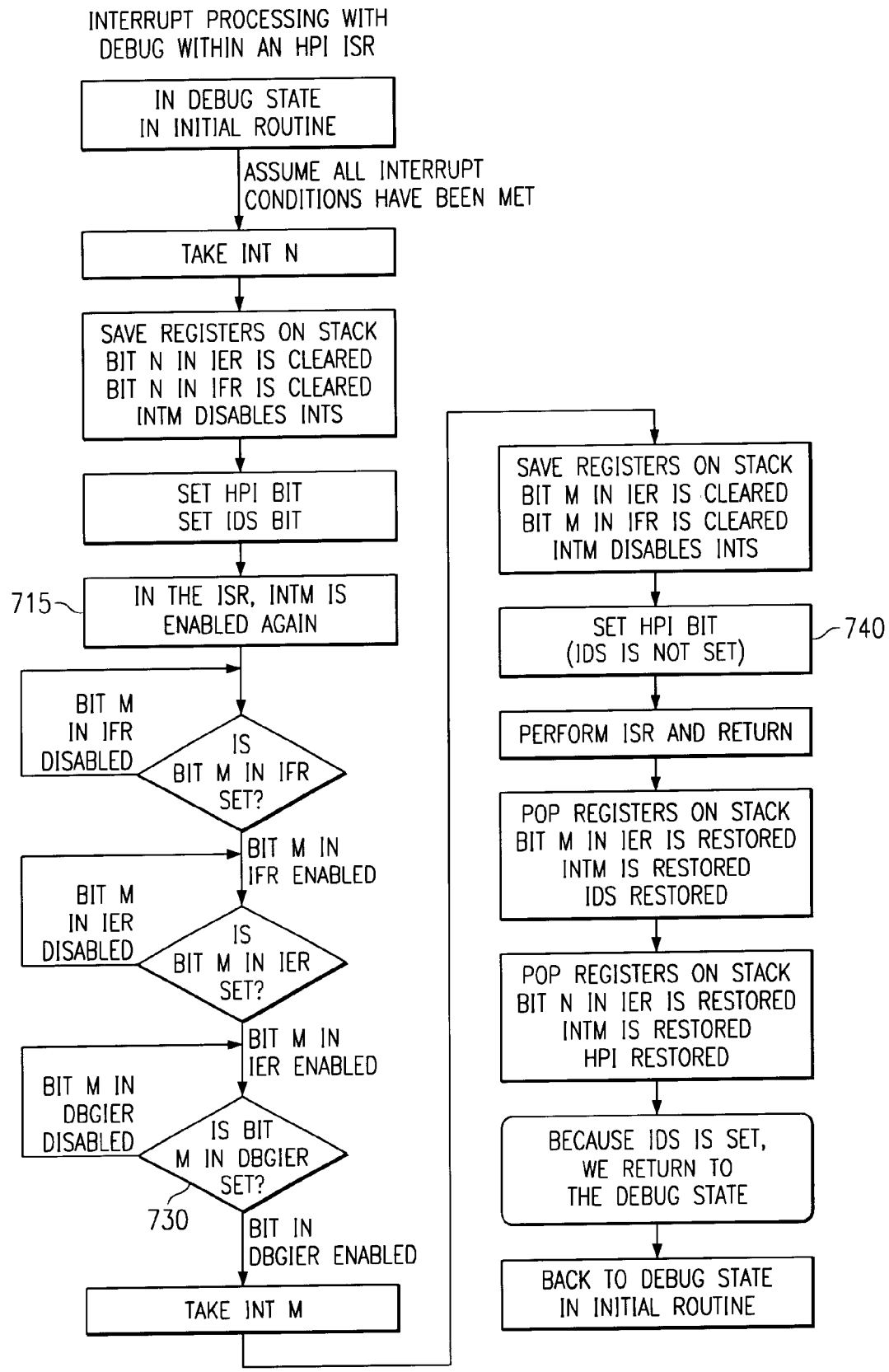
FIG. 14 is a flow chart of steps performed within a high priority interrupt service routine when a high priority interrupt occurs during the debug state.

FIG. 14 is a flow chart of steps performed within a high priority interrupt service routine when a second high priority interrupt occurs. It is possible for multiple interrupts to occur and be serviced while the device is in debug state if interrupts are re-enabled, as in step 715. Step 730 determines if the pending interrupt is in fact a high priority interrupt by checking the corresponding bit in DBGIER. In this case, the IDS bit is not set in step 740.

HP interrupt service routines (ISR) that execute during the IDS state must use the return from interrupt (RTI) or abort interrupt (ABORTI) instruction provided by the CPU architecture. These ISRs can return to the DSUSP state or be interrupted. The debug thread maintains a path back to the DSUSP state when the application concludes the ISR execution with an RTI instruction. Reset, a functional run (disable debug) directive, or execution of an abort interrupt instruction (ABORTI) breaks this link, clears the HPI and IDS status bits and set the appropriate status in the execution status register.

An illegal-instruction trap cannot be blocked, not even during emulation. Once initiated, an illegal-instruction trap operates the same as a TRAP #19 instruction. As part of its operation, the illegal-instruction trap saves the return address on the stack. Thus, the offending address can be detected by examining this saved value.

When asserted, the reset input signal (RS) places the core into a known state. As part of a hardware reset, all current operations are aborted, the pipeline is flushed, and the CPU registers are reset as shown in. Then the RESET interrupt vector is fetched and the corresponding interrupt service routine is executed. Although RS cannot be masked, there are some debug execution states in which RS is not serviced, as described earlier.

Debug Status

Allowing for break events within high priority interrupts requires that information about what caused each break event be remembered, since the internal status information will change with each break event. The Debug Status register, DBGSTAT, indicates whether and why the debug state was entered. This register is saved/restored as part of the interrupt context save/restore, even when an interrupt is taken while the device is not in the debug state. It is also accessible through the data memory location 0x0800. The Debug Status Register is described in Table 8. Bits which are not described as Read Only can be written to via a context restore.

TABLE 8

Debug Status Register: DBGSTST

| | | |
|---|---|---|
| 15 | IDLE_FLAG | Read Only: Device is in the IDLE state. |
| 14 | BRK | Set to indicate a STOP due to a hardware breakpoint. |
| 13 | BRK_PEND | Set to indicate that a hardware breakpoint has requested a STOP, but that the STOP has not yet occurred. |
| 12 | ANASTOP | Set to indicate a STOP due to an Analysis event |
| 11 | ESTOP1 | Set to indicate a STOP due to an ESTOP1 instruction. |
| 10 | ESTOP0 | Set to indicate a STOP due to an ESTOP0 instruction. |
| 09 | HPI | Set to indicate a high priority interrupt (one enabled in DBGIER) is being serviced. Set by taking a time-critical hardware interrupt (one who's bit is set in DBGIER) regardless of whether the device was in the debug state when the interrupt began. When this occurs, the previous value of HPI is pushed on the stack as part of DBGSTAT. This bit is modified by pops of DBGSTAT from the stack (this is how this bit will be cleared upon returning from a time-critical interrupt). Cleared by reset or ABORTI. |
| 08 | IDS | Indicates that the device was awakened from the debug state (DSUSP) by the current time-critical interrupt. Set by taking an interrupt while in the debug state (only an interrupt who's bit is set in DBGIER can do cause this). Cleared by taking any interrupt while not in the debug state (whether that interrupt's bit is set in the DBGIER doesn't matter). This bit is modified by pops of DBGSTAT from the stack (this is how this bit will be cleared upon returning from the time-critical interrupt that awoke the device from the debug state). Cleared by reset or ABORTI. |
| 07:06 | EXSM [1:0] | Read Only: Current EXSM state: IDBG = 3 IDS = 2 DSUSP = 1 EXE = 0. |
| 05 | FXWORK | Read Only: Set if the CPU's write to FXREG succeeded, cleared if write was blocked. |
| 04:00 | DFC[4:0] | Read Only: Current DFC value. Set to −1 by SYNC_LOSS. |

Debug Instructions

Several instructions are provided for use by test host 13 during emulation, as described in Table 9. The operation of ESTOP0 and ESTOP1 within target device 10 depends on whether an emulator, such as test host 13, is connected. Target device 10 knows that test host 13 is connected when one of three states, EXE_COND, EXE_STEP, and EXE_HALT, is applied to the emulation control state machine. Conversely, when EXE_CONT is applied, test host 13 is not connected. EXE_CONT can be generated from TRST- and via debug software control from test host 13.

TABLE 9

Debug Instructions

| | |
|---|---|
| ESTOP0 | Used for a software breakpoint. When an emulator is connected, the ESTOP0 instruction stops processor execution with the PC pointing to the ESTOP0 address. Otherwise, an ESTOP0 advances the PC past the ESTOP0 instruction. |

TABLE 9-continued

Debug Instructions

| | |
|---|---|
| ESTOP1 | Used for a embedded breakpoint. When an emulator is connected, the ESTOP1 instruction stops processor execution with the PC pointing to the instruction after the ESTOP1. Otherwise, an ESTOP1 advances the PC past the ESTOP1 instruction. |
| EALLOW | Enables access to memory-mapped emulation registers. The emulator can override EALLOW by setting a scan-only bit which will block writes regardless of EALLOW. The EALLOW bit is in ST1. This is a four cycle instruction. |
| EDIS | Disables access to memory-mapped emulation registers. This is a four cycle instruction. |
| ABORTI | Indicates that an ISR will not be returned from. This clears the IDS and HPI bits in the DBGSTAT register, sets DBGM, and resets the Debug Frame Counter. This will cause the debug software to disregard any and all outstanding debug states. Executing an ABORTI essentially resets the debug information. |
| PUSH DBGIER | Writes the current value of the DBGIER instruction onto the stack. |
| POP DBGIER | Reads a value from the stack and places it in the DBGIER register. |

Aborting from Interrupts

In some target device applications, there will be interrupts which are not returned from in the normal manner. This can cause a problem for debug, since register bits such as HPI, IDS, and DFC make assumptions that returning from an interrupt will "put things back" the way they were. The ABORTI instruction is provided as a means to indicate that an interrupt is not going to be returned from, and causes the emulation circuitry on core processor 15 to be reset to it's default state. The ABORTI instruction clears IDS and HPI in the DBGSTAT register. This means if core processor 15 was in the debug state when the interrupt occurred, it will not return to the debug state. The ABORT instruction disables DBGM in status register ST1. The debug frame counter is re-initialized. This means that if there were multiple debug states outstanding (something that will only occur when break events occur within time-critical interrupts) they will be forgotten—debugging is starting anew.

The ABORTI instruction does not modify the DBGIER register; it does not affect non-debug registers such as INTM or IER; nor does it clear or change the analysis registers relating to Breakpoints, Watchpoints, Benchmark Counter, and PSAs or High Speed Data Logging.

Debug Architecture Embodiment

An embodiment of the present invention is referred to as ICEMaker.™ This architecture creates a set of capability that enables sophisticated system debug and test. This debug architecture, composed of several building blocks, provides a scaleable set of capability. The building blocks have both mandatory and optional components. The mandatory components cannot be excluded from a building block. A building blocks descriptions identify capability as mandatory or optional.

Building blocks are architecture independent. Most if not all building blocks require a wrapper to connect them to other CPU components. For instance, many of the registers used for debug are memory mapped. The register is in the generic component while the placement of the register in the memory map and the logic needed to read the register is in the wrapper. Models for the generic component can be easily ported from design to design, modulated to optimize bus widths when required.

Figure 15:
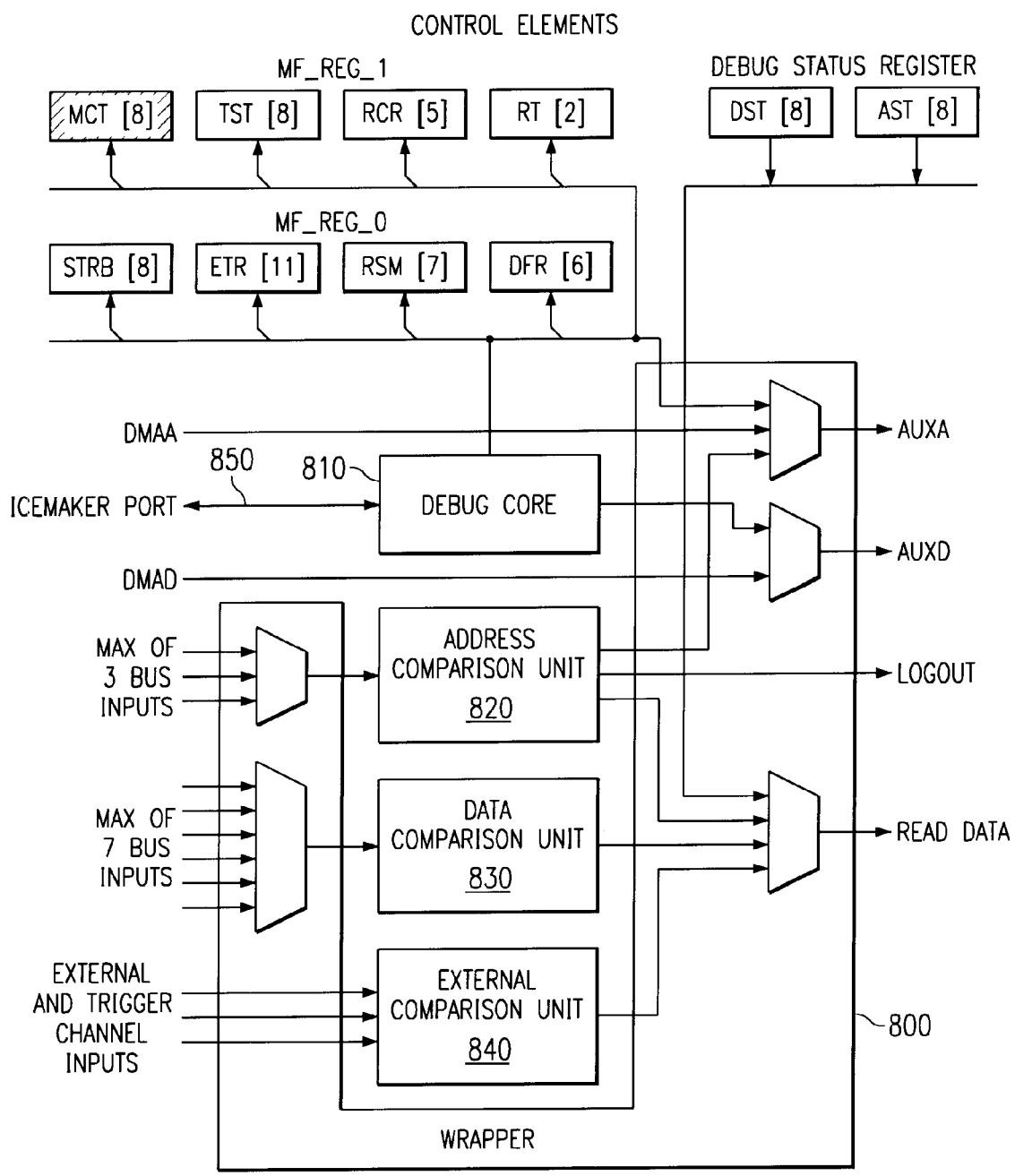
FIG. 15 is a block diagram of an embodiment of emulation circuitry according to the present invention.

FIG. 15 is a block diagram of an embodiment of emulation circuitry according to the present invention, the ICE- Maker Unit (IMU) architecture showing both the fixed and variable portions of the components. The wrapper portion 800 of the ICEMaker function is device specific, completing the creation of specified ICEMaker functions by adapting the standard architecturally independent portion of the function to a specific CPU architecture. Debug core 810 contains all components necessary for interacting with a test host. Other ICEMaker building blocks are listed in Table 10.

TABLE 10

ICEMaker Building Blocks

| | |
|---|---|
| Debug Core 810 | The capability required to create a debug tool according to aspects of the present invention |
| Address Comparison Unit 820 | Provides event, break, data logging, PSA, and counter functions |
| Data Comparison Unit 830 | Provides event, break and PSA and counter functions |
| External Comparison Unit 840 | Provides break functions for external and trigger channel inputs |
| Control Elements 860 | Specific components such as trigger channel or execution control |

Figure 16:
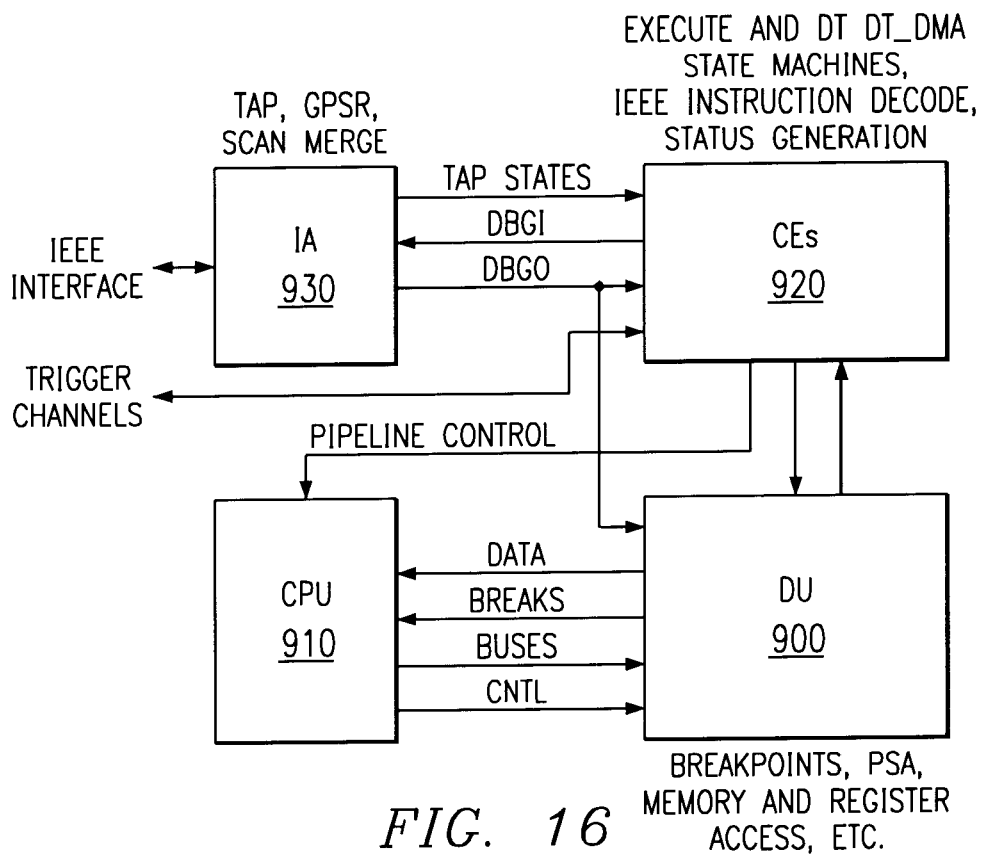
FIG. 16 is a block diagram of the debug core of FIG. 15.

FIG. 16 is a block diagram illustrating the functional partitioning of the IMU. Debug unit 900 provides a connection to core CPU 910 buses and pipeline. This unit also contains the debug registers such as ACU 820, DCU 830, and ECU 840 used to access CPU registers and memory. CEs 920 are a collection of control functions for DU logic and registers and other blocks such as CPU execution control. Interface adaptor (IA) 930 provides a bridge between the IEEE scan and test access port activity (TAP) at ICEMaker port and the CE/DU logic.

The IA is a generic function and is CPU core independent. This capability includes a IEEE 1149.1 Test Access Port (TAP), very basic scan capability, and the TDO output management. Interface adapter 930 supplies glitch free decoded tap signals to the remainder of the system including ASIC logic external to the CPU MegaModule. System logic external to the CPU MegaModule can use IEEE op-codes allocated to system functions to create customized IEEE functions such a boundary scan or similar capability. The 38 bit instruction register value provides numerous unused op-code groups that can be used in other parts of a design. This allows ASIC modules to share the use of the Mega-Module IEEE scan and TAP facilities.

A 38-bit scan path consisting of a 6 bit extended shift register (EXSR) and 32 bit general purpose shift register (GPSR) creates the IA's instruction scan path. The GPSR supplies a 32 bit data value while the EXSR identifies the instruction class (op-code). Data scans use the 32 bit GPSR in several configurations. The EXSR forms a six bit counter for data scans, creating markers for specialized transfers. This counter, coupled with special GPSR scan path configuration, provides extremely high bandwidth production test upload and download sequences, receiving data four bits at a time from the TDI_i, TDO_i, nET1_i, and nET0_i terminals or transmitting data four bits at a time from the TDI_o, TDO_o, nET1_o, and nET0_o terminals for uploads.

The CEs 920 block contains a number of state machines and the combinatorial logic necessary to manage debug functions. The CE logic includes all debug control needed to manage the DU function. This includes state machines and combinatorial logic needed to manage capabilities such as breakpoints, counters, benchmarking, and data logging. This block defines IEEE op-code usage and scan paths subject to guidelines established in this document. CE logic supplies synchronization between TCK and FCK logic. Since there are number of varied CE components, modeling them separately allows optimum physical placement within the Mega-Module.

The CE functionality includes but is not limited to:
IEEE instruction register controls;
IEEE instruction register decode;
Synchronization between the TCK and FCK clock domains;
Status acquisition;
Scan framework;
CPU execution control;
DMA control;
Debug memory read and write control;
Event generation logic;
Miscellaneous DU control; and
Trigger channels.

Debug Unit (DU) 900 is the debug and test connection to the CPU 910 data path. It is tightly coupled to the CPU and its buses. The DU functionality is portable to varied architectures but tailored to match CPU address and data bus widths. Since it connects to most of the CPU data path, it is logical that the CPU datapath includes the DU. Its functionality includes: memory access; register access; multiple breakpoints; benchmarking and event counting facilities; timers; data logging; DMA address and data management; communication register; CPU Core Signature Analysis, user definable signature analysis, and expedited test load/unload.

A combination of DU and CE logic provides access to CPU registers and memory. The DU provides a dual interface, scannable and memory mapped, to debug facilities such as breakpoints, benchmarking, data logging, and PSAs.

Figure 17:
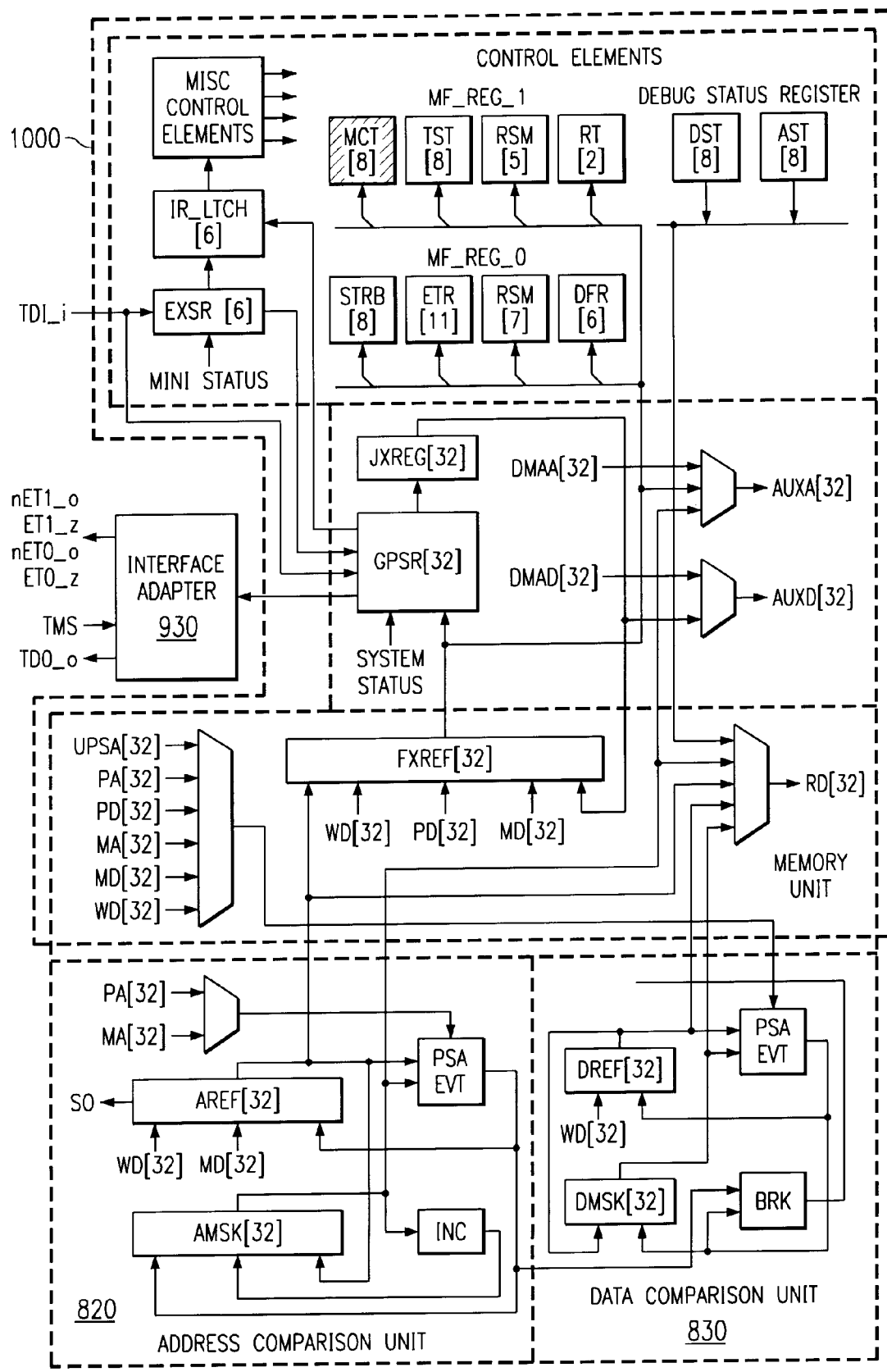
FIG. 17 a more detailed block diagram of the emulation circuitry of FIG. 15.

FIG. 17 a more detailed block diagram of the emulation circuitry of FIG. 15. The IMU contains three large blocks of logic as shown. These blocks are the Memory Unit (MU) 1000, Address Comparison Unit (ACU) 820 and Data Comparison Unit (DCU) 830. The units are the backbone of the IMU and comprise the Debug Unit (DU). Control elements (CEs) 1010 support the DU and provide control functions for it. These elements include the ACU 820, DCU 830 and ECU (External Control Unit) 840 control registers, not shown in FIG. 17. The MU provides the basic debug access to memory and registers for execution control. Most if not all miscellaneous register functions and control bits reside in this function. The ACU provides Breakpoint, Counter, PSA and Data Logging support. The DCU provides Breakpoint and PSA support. A third small unit, the ECU controls external inputs to the event functions.

ICEMaker Port 850 provides the interface to all CPU MegaModule scan paths. All instruction and data scan paths of the MegaModule involve the memory unit. Two registers, a 32 bit General Purpose Shift Register (GPSR) and a six bit Extension Shift Register (EXSR) combine to provide support for all instruction and data scan paths.

The GPSR scans during instruction and data scans. The EXSR scans during instruction scans and reconfigures as part of a six bit counter during data scans. This is practical as the EXSR is not part of any data scan string. The CAPTURE_IR state loads both registers, the GPSR with the contents of either the FXREG or system status and the EXSR with a mini status. The mini status defines the contents of the GPSR one of several data forms.

The LD_REGS_0, and LD_REGS_1 instruction classes can load debug control registers within the IMU (MF_REGS_0 and MF_REGS_1) or just retrieve read data or system status. The load of these registers occurs when the IDLE state immediately follows an instruction scan defining these classes (an instruction scan ending in IDLE). The 32 bit data field accompanying the op-code class designation provides the data used to load the MF_REGS_0 and MR_REGS_1 registers. These registers partition into segments that are individually loadable. Bits imbedded in the 32 bit data field control the load of specific register segments in both the MF_REGS_1 and MF_REGS_0 registers. In other words, the 32 bit data value contains both the register segment data and register segment load enables.

The MF_REGS_0 and MF_REGS_1 registers are in the FCK domain. Data is first loaded into the JXREG by the JTAG Update_IR state or its equivalent. The JTAG state transition from the UPDATE_IR the IDLE state (accompanied by the MF_REGS_0 or MF_$_{REGS}$_1 op-code initiates the transfer. Previously loaded JXREG data that has not been dispositioned (used) blocks the load of new JXREG data. Data moves from the JXREG to the FXREG where it moves to the enabled register segments, or, in the case of MF_REGS_1, generates strobes. Consequently, loading of the MF_REGS_1 and MF_REGS_0 segments inhibits changing the JXREG, FXREG and instruction (IR_LTCH) registers until the transfer completes. These registers can be loaded by the application when the special monitor mode is enabled at the MegaModule boundary. An assembly language register write instruction first writes the data into the FXREG. From there it is moved to the appropriate register. The application sees the MF_REGS_0 and MF_REGS_1 registers in the memory map. A write to either register first writes the data into the FXREG. From there it is moved to the appropriate register just as with scannable scenario. The write to the FXREG is transparent to the application software.

Table 11 shows the strobes that can be generated by writing to the MF_REG_0 register. A one in any bit position creates the specified action while a zero creates no action. Table 12 contains a brief description of the MF_REGS_0 segments. Table 13 contains a brief description of the MF_REGS_1 segments. Table 14 describes the individual bits in the MCT register segment, while Table 15 describes the test segment bits. The reset control register segment, shown in Table 16, provides reset modes for the CPU MegaModule. The real-time segment, shown in Table 17, provides reset modes for the CPU MegaModule.

TABLE 11

MF_REG_0 Generated Strobes

| Bit | Mnemonic | Type | Description |
|---|---|---|---|
| 31 | CMD_ERR | FS | Initialize command error |
| 30 | INIT_DFC | FS | Initialize DFC to all ones. |
| 29 | IDLE_FLAG | FS | Clear Idle flag |
| 28 | NF_SUSP | FS | Clear new frame suspend |
| 27 | TF_SUSP | FS | Clear target frame suspend |
| 26 | SYNC_ERR | FS | Clear synchronization loss |
| 25:24 | Reserved | | |

TABLE 12

Miscellaneous Function Register Zero Segments

| Segment | # Bits | Description |
|---|---|---|
| Strobes | 8 | Strobes |
| ETR | 11 | Emulation and Test Pin Control - Defines the |

TABLE 12-continued

Miscellaneous Function Register Zero Segments

| Segment | # Bits | Description |
|---|---|---|
| | | ET pin operating modes. This field supports a five bit control mechanism for each ETx pin plus a one bit segment select. |
| RSM | 7 | Run State Machine - This register segment is the run state machine. This field supports a 5 bit RSM with two segment selects. The first qualifies the load of the segment and the second qualifies the load of the segment based on the CPU running or halted. |
| DFR | 6 | Debug Frame Register - Defines the debug frame. This field supports a one bit segment select and a maximum DFR of 6 bits |

TABLE 13

Miscellaneous Function Register One Segments

| Segment | # of Bits | Description |
|---|---|---|
| MCT | 8 | MU Cycle Type Register - Defines the qualification (High priority and rudeness level for accesses generated by the memory unit. This segment contains a seven bit register and a one bit segment select. This register segment is not implemented when the 7 bit data value generated by this register segment can be concatenated with the address and the total number of bits be less than or equal to 32 as shown in FIG. 5-5. |
| Reserved | 9 | Reserved |
| TST | 8 | Test Register- Defines the test modes or clock source This segment contains a six bit register and a one bit segment select. |
| RCR | 5 | Reset Control Register - Defines reset modes and capabilities. This segment contains a four bit register and a one bit segment select |
| RT | 2 | Real-time - This register segment contains the real-time bit and a one bit segment select. |

TABLE 14

MCT Segment Description

| Bit Name | Bit # | Description |
|---|---|---|
| MCTEN | 31 | MCT Enable - MCT segment enable |
| NOID | 30 | No ID - This bit, when a one, causes the MU access to not be qualified by the DFC and DFR comparison. When this bit is a zero, the DFC and DFR comparison qualifies the MU access request. (No match is no request.) |
| MUHP | 29 | MU High Priority - Memory unit access high priority. When a one, the memory unit access request is high priority. When a zero the access request is low priority.. |
| MHPIU | 28 | MU DBG qualifier - When this bit is a one, the status register HPI bit has no influence on a MU access request. When a zero, the status register HPI bit must be a zero to generate a MU access request. |
| MDBGU | 27 | MU DBG qualifier - When this bit is a one, the status register DBGM bit has no influence on a MU access request. When a zero, |

TABLE 14-continued

MCT Segment Description

| Bit Name | Bit # | Description |
| --- | --- | --- |
| | | the status register DBGM bit must be a one to generate a MU access request. |
| CYC[2:0] | 26:24 | Cycle Type - Forms the three cycle code bits for MU cycles. |

TABLE 15

TST Segment Description

| Bit Name | Bit # | Description |
| --- | --- | --- |
| TSTEN | 23 | Test Segment Enable - This bit, when a one, allows the remainder of the test segment to load from the FXREG. When this bit is a zero, the TEST segment. |
| CKSRC [1:0] | 22:21 | Clock Source - This field selects a MegaModule clock source for the functional logic.<br>00 - Functional clock 0<br>01 - Functional clock 1<br>10 - Test clock<br>11 - Test clock divided by two |
| TSTMAP | 20 | Test Map - Switch the memory map to the test configuration when this bit is a one. Use the normal memory map when a zero. |
| ISOLATE | 19 | Isolate - Disconnect the CPU MegaModule inputs when this bit is a one, supplying alternate inputs from the MegaModule. MegaModule generated stimuli connect to these inputs. Use the normal CPU MegaModule inputs when this bit is a zero. |
| Reserved | 18:16 | Reserved |

TABLE 16

RCR Segment Description

| Bit Name | Bit # | Description |
| --- | --- | --- |
| RCREN | 15 | Test Segment Enable - This bit, when a one, allows the remainder of the test segment to load from the FXREG. When this bit is a zero, the RCR segment does not load. |
| RES_SET | 14 | Reset Set - Set the Res_Ltch when this bit is a one. Do nothing when this bit is a zero. The reset disconnect function does not affect the function of this bit. The generation of reset by this bit. |
| RES_CLR | 13 | Reset Clear - Attempt to clear the Res_Ltch when this bit is a one. |
| RES_DIS | 12 | Reset Disconnect - Disconnect the SE and system resets from the Res_Ltch when this bit is a one. Connect these resets when this bit is a zero. |
| RES_STAY | 11 | Reset Stay - Set the Res_Stay bit to the value of this bit. The reset stay bit, when a one stretches an incoming reset indefinitely until this bit is set to a zero. |

TABLE 17

RT Segment Description

| Bit Name | Bit # | Description |
| --- | --- | --- |
| RTEN | 15 | Real-time Segment Enable - This bit, when a one, allows the remainder of the real-time segment to load from the FXREG. When this bit is a zero, the real-time segment does not load. |

TABLE 17-continued

RT Segment Description

| Bit Name | Bit # | Description |
| --- | --- | --- |
| RT | 14 | Real-time - This bit, when a one, places the CPU in real-time mode. When a zero it places the device in stop mode. |

The LD_DMA_WD instruction loads the JXREG with the data in the data field of the instruction for use as write data by the internal DMA. When the DMA is activated to do writes originating from the JTAG block, it uses this data to generate a memory writes. DMA notification of data available occurs provided the instruction scan passes directly from the Update_IR state to the IDLE state and JXREG load of the write data was not blocked by a busy condition. When the DMA is not activated it hangs the interface.

Debug software can use two mechanisms to get to system resources. This instruction directly supports one of them, the MU option. The memory unit (MU) provides register set (an address register and write data register) that debug software loads for each access. The address register doubles as the read data input register. Once the read is initiated, the address is no longer needed so this does not present a problem. The address register is loaded through the write data register. Debug software provides the address for each read access and initiates the read access with a single instruction scan. It must end in the IDLE state, passing directly from the Update IR to the IDLE state to load the address.

A second read option, indirectly supported by this instruction, requires the address comparison unit (ACU) to supplement the MU registers with auto incrementing address generation. Debug software allocates the ACU to breakpoints, PSA generation, timing and benchmarking features, and DMA address generation. During data logging the application uses the ACU DMA facilities while production tests use the DMA facilities to expedite test down loads. Because of the multifunction aspects of the ACU, it is not generally used for low bandwidth transfers.

The SYS_ACC_W instruction directly supports the debug software's ability to generate write accesses using the memory unit (MU) resources. The memory unit (MU) provides register set (an address register and write data register) that debug software loads for each access. The address register is loaded through the write data register, necessitating the address register be loaded first. The load of these two registers uses the same instruction with different option fields. The instruction address size/type option is specified for the instruction scan that loads the address. This instruction scan loads the address register (FXREG) but does not initiate an access. It must end in the IDLE state to load the address. The second instruction scan uses one of the three data size type options. These options specify the data size. The underlying hardware combines the two LSBs of address with the size/type information to fully define the access. The second instruction scan must also end in IDLE. This instruction scan places the write data in the write register (JXREG).

The SYS_ACC_W instruction class provides directly for MU accesses. It indirectly supports the block transfer capability as MU writes can activate the ACU internal DMA. This gives debug access to block reads and writes using an auto-incrementing address mechanism in the ACU. Debug software defines the starting DMA address and activates the DMA (as opposed to the application doing it in data logging modes). Write(s) to the to the DMA address generator/word counter, activating the DMA ready the DMA for read and write transfers using the JXREG, the normal write data buffer.

The MU and ACU memory access mechanisms share a write data buffer but have separate read data buffers. This allows simultaneous reading from both mechanisms, read with one mechanism and write with the other. Writes can be interleaved by debug software but do not occur simultaneously (first one mechanism and then the other).

The test access instruction classes provides fast download (TEST_ACC_W) and upload (TEST_ACC_R) of memory in the production test environment. Both of these instruction classes reconfigure the scan chain for data scans. This supplies four scan inputs for the TEST_ACC_R instruction and four scan outputs for the TEST_ACC_W instruction. TDI handles the most significant byte, TDO_o the next, nET1, the next, and nET0 the least significant byte for both reads and writes. The both reads and writes use the ACU address mechanism to do block transfers. Instruction scans ending in IDLE use the 32 bit data field of these two instructions to load the 16 LSBs of MF_REG_1 and the 16 bit ACNTL.

These instructions clear the AMSK, AREF, DCNTL, DMSK, DREF, and ECNTL registers when the ACNTL register is loaded. This allows reset to be applied, the clock source to be specified, and the initiation of internal DMA to occur simultaneously.

The JXREG sources the write data the writes, independent of the space defined by the ACNTL register. The FXREG receives all read data, from program memory, data memory and auxiliary spaces. For reads, the ACU issues continuous read requests. This continues until the DMA action terminates. A not ready condition occurs when the FXREG is loaded. Reading the FXREG data generates a ready for one clock and then the FXREG fills again. Since data scans export the read data, there is no mini status and a new word is exported every eight clocks. A nibble is output from the export pin set every TCK (every 5 ns at 200 MHz). Reaching the access limit specified by the word count or other halt mechanism ends the read requests. The cycles in the memory pipeline continue and the new read data moves to the FXREG as the FXREG empties into the GPSR. Eventually the memory pipeline completely empties and no new data is available. The EXSR counter loads the first word into the GPSR during the Capture_DR state and subsequently moves data from the FXREG to the GPSR every eight Shift_DR states after the initial capture state. The MF_REGS_1 load must apply reset to the CPU, and specify TCK/2 as the clock source.

Running through an example calculation, a TCK frequency of 200 MHz yield a functional clock frequency of 100 MHz. The 200 MHz TCK provides an input or output bandwidth of 800 Mbits/sec. A 1000 32 bit word test case would take approximately 40 usec to load. Assuming the CPU takes on average two clocks per word to execute this program, the CPU takes approximately 20 us to complete the test execution. This makes the ratio of test load time to execution time approximately 2 to 1. This ratio is also valid for unload times.

This instruction provides for the generation of TCK based strobes that coincide with the duration of the IDLE state following an instruction scan. It also provides high bandwidth transfers by allowing imbedded commands in a data scans.

This instruction provides for the initialization of miscellaneous error detects, in addition to providing for the initialization of the command interface. Since other instructions can request actions that cannot be completed, (i.e. the rudeness level of a memory access can be low enough that it is blocked), a mechanism to abort a request in progress is needed. This allows the debug interface to change the access criteria before trying again.

Table 18 lists all the debug related registers for ICEMaker. Miscellaneous control bits supporting the JTAG interface are not included in this list. Most but not all of the debug unit registers are placed in the memory map so they are accessible by both debug software and the application. There are three levels of register access: registers always shared by the application and debug facilities; registers accessed through the ICEMaker™ Port only; and registers accessed through the ICEMaker™ Port or a specially privileged monitor program but not shared.

The application and debug software share registers controlling external trigger event inputs, breakpoints and watchpoints, data logging, PSA, and count functions. The application and debug software can not simultaneously own these resources but establish ownership and release ownership through memory mapped control registers continuously visible to both the application and debug software. The debug software has the ability to seize any resource if necessary, or negotiate with the application through software sequences.

Other registers are specific to JTAG scan support and can never be accessed by the application. This class of registers is clocked with TCK and includes the JXREG, GPSR. EXSR, and IR_LTCH registers. Another register, the MF_REGS_1 register is clocked with FCK but is not accessible to the application. This register controls the device execution mode (real-time and stop mode), special reset modes, test modes, clock source selection and the like. The application could get suicidal if granted access to this register.

A third class of registers is accessible through JTAG and accessible to the application if a special privileges are granted to a monitor function via a CPU MegaModule terminal (MON_PRIV). When this terminal is grounded the application cannot access this register class. When this terminal is a logic one, the application code can access a debug control register normally controlled by JTAG scans. This register contains ETx pin control, execution control, the debug frame reference register.

TABLE 18

Debug Register List

| Width | Memory Mapped | Register Name | Description |
|---|---|---|---|
| 8 | No | IR_LTCH | Latched Instruction Register |
| 6 | No | EXSR | Extended Shift Register |
| 32 | No | JXREG | JTAG Transfer Register |
| 32 | No | GPSR | General Purpose Shift Reg. |
| 32 | No** | FXREG | Functional Transfer Register |
| 32 | No | MF_REGS_1 | Misc. Function Register 1 |
| 32 | Yes | MF_REGS_0 | Misc. Function Register 0 |
| 16 | Yes | DBG_STATUS | Debug status |
| 16 | Yes | ECNTL | External Event Control |
| 16 | Yes | ACNTL | Address Unit Control |
| 32 | Yes | AMSK | Adrs. Mask Register |
| 32 | Yes | AREF | Adrs. Reference Register |
| 16 | Yes | DCNTL | Data Unit Control |
| 32 | Yes | DMSK | Data Mask Register |
| 32 | Yes | DREF | Data Reference Register |
| 16 | Yes | HPIR | High Priority Interrupt Reg. |

TABLE 18-continued

Debug Register List

| Width | Memory Mapped | Register Name | Description |
|---|---|---|---|

**Monitor privileged writes to MF_REG_0 use the FXREG as a temporary register.

SUMMARY

Table 19 provides a summary of terms used herein. Table 20 provides a summary of difficult boundary conditions that relate to the execution that state machine. Table 20 provides a summary of difficult conditions that relate to the IDLE instruction.

TABLE 19

Summary of Emulation and Architectural Terms and Abbreviations

| Term | Description |
|---|---|
| BACKGROUND CODE | Main body of code, generally not as time-critical as ISR routines which service motor controls or high-speed timers. |
| BREAK EVENT | A debug event which has been selected to halt the device. Typically, actions such as the decoding of an ESTOP, occurrence of an analysis watchpoint, or request of the host, will halt the device. A hardware break event is a break event other than an ESTOP. |
| BREAKPOINT, ANALYSIS | See BREAKPOINT, HARDWARE. |
| BREAKPOINT, HARDWARE | Analysis event which triggers when the instruction about to be performed is from a certain address. This is also referred to as an analysis breakpoint. |
| BREAKPOINT, SOFTWARE | See ESTOP. |
| BTT | See XDS-524. |
| DATA LOGGING | The rapid transfer of memory contents between the device and a host, as initiated by the device application. |
| DBGACK | Core signal which indicates that the device is in debug mode. This has historically been called SUSPEND, and it may be changed to this name to prevent confusion.. |
| DBGM | Debug Mode bit within ST1 which must be enabled to allow polite DT-DMA accesses and hardware break events. |
| DFC, DFR | See DEBUG FRAME COUNTER and DEBUG FRAME REGISTER. |
| DT-DMA | Debug and Test Direct Memory Access. A mechanism to access memory and registers without fetching CPU instructions from memory or requiring the CPU to stop. |
| DEBUG FRAME COUNTER | Counter which keeps track of nested interrupts when the device is stopped in debug mode. |
| DEBUG FRAME REGISTER | Register which is compared against the Debug Frame Counter to ensure that the device state being accessed is what the debug software expects. |
| DEBUG EVENT | An action such as the decoding of an ESTOP, occurrence of an analysis watchpoint, or request of the host, which may result in special debug behavior, such as halting the device or pulsing one of the EMU0/EMU1 signals. Often times when "debug event" is mentioned instead of a "break event", it means the device will not enter the debug state. |
| DEBUG STATE | State in which the device does not execute application code but may perform debug tasks. |
| DEBUG AND TEST MODE | Used to indicate how the debug resources are to be used. |
| DEVICE | Device power-up mode, |
| OPERATING MODE | typically used for test purposes. |
| DBGSTAT | Debug Status register. This is saved/restored as part of the interrupt context save/restore. |
| EALLOW | Emulation instruction which enables access to memory-mapped emulation registers. |
| EDIS | Emulation instruction which disables access to memory-mapped emulation registers. |
| EMULATION | The duplication of a device's behavior while providing additional visibility and control over it's normal operation. Methods of achieving this include self-emulation and in-circuit emulation. |
| EMULATION, SELF- | Features of a device which grant a user visibility and control over it's own normal operation. |
| EPK | Emulation Porting Kit. A software library providing access and control to a device via the scan controller. The host debugger source code is available within the EPK. |
| ESTOP | Emulation instruction whose decoding produces an event which causes the device to enter the debug state if an emulator is connected. Used to implement software breakpoints. |
| EMU0 | Emulation and Test trigger channel 0. Used for asynchronous communications between the device and the scan controller (and potentially other devices or equipment) |
| EMU1 | Emulation and Test trigger channel 1. See EMU0 above. |
| EXE_COND | Execution state in which instructions are performed until a break event occurs. |
| EXE_CONT | Execution state in which instructions are performed as if the emulator is disconnect. |
| EXE_HALT | Execution state in which execution is suspend. Instructions are not fetched. |
| EXE_STEP | Execution state in which a single instruction is performed, and then execution is suspended. |
| FLATTENING | Pipeline flattening aligns the bus cycle activity for the program instruction fetch, data operand reads, and data result write into a single cycle. |
| FLUSHING | The act of discarding the contents of pipeline stages prior to the second decode while allowing the second decode and later pipeline stages to complete. |
| FOREGROUND CODE | Time-critical code implemented as an interrupt-service routine. See Time-Critical Interrupt. |
| HPI | High Priority Interrupt bit in ST1 indicates whether the current interrupt is, a high priority interrupt. This can be used to optionally block hardware break events. |
| DBGIER | Debug-enabled Interrupt Register. Indicates which interrupts are time critical. In realtime mode, time critical interrupts can interrupt the device while it is in the debug state. |
| HOLES | Unused cycles which can be utilized for DT-DMA. Holes can occur naturally due to branches, or be inserted by high priority DT-DMA requests. |
| HOST | A personal computer or workstation which interacts with the target system. In this document, "host" generally refers to the computer running the debugger software. |
| HSTOP | Emulation (external) event which causes the device to enter the debug state. |
| ICE | Traditional abbreviation for "In-Circuit Emulator". |
| IDS | Interrupt During Device State bit within ST1 indicates whether device was interrupted by a high |

TABLE 19-continued

Summary of Emulation and Architectural Terms and Abbreviations

| | |
|---|---|
| | priority interrupt while it was in the debug state. If this bit is set when a RETI instruction is executed, the device will enter the debug state upon returning. |
| IDLE | Low-power mode in which CPU operation is suspended. |
| IDLE_FLAG | Indicates a request for the device to enter the low-power mode. |
| IER | Interrupt Enable Register. Part of the standard CPU architecture. |
| IFR | Interrupt Flag Register. Part of the standard CPU architecture. |
| IMR | Interrupt Mask Register - this is an older term - IER is now more commonly used. Part of the standard CPU architecture. |
| IN-CIRCUIT EMULATOR | A development system in which the device being emulated is replaced by a development system which duplicates the functionality of the device while providing additional visibility and memory configuration options, as well as control over the device's operation. |
| INTERRUPT BOUNDARY | Indicates a point at which an interrupt can be taken. |
| ISR | Interrupt Service Routine. Part of the standard CPU architecture. |
| JTAG | Abbreviation for the IEEE Std. 1149.1, "Standard Test Access Port and Boundary-Scan Architecture" which defines a protocol based on a five-pin interface (TCK, TMS, TDI, TDO, and TRST-) used for test and emulation. |
| NMI | Non-maskable interrupt. Part of the standard CPU architecture. |
| NULL | Micro-instruction which is similar to a NOP but does not increment the PC. |
| PC | Device program counter. Part of the standard CPU architecture. |
| POLITE DT-DMA | A DT-DMA access which does not occur if the DBGM is disabled. |
| PSA | Parallel Signature Analysis. Similar to a circular-redundancy check or checksum, a PSA is used to calculate a unique number given a sequence of values. By sampling bus activity during a test case, it is possible to verify proper CPU operation at speed. |
| PRODUCTION DEVICE | A device which is intended for volume production and sale. Cost (as determined by silicon size, package type, test time, and other factors) is of key importance. |
| PULSE EVENT | An action such as the decoding of an ESTOP, occurrence of an analysis watchpoint, or request of the host, which causes a pulse on one of the EMU0/EMU1 signals. |
| REAL-TIME | Debug mode in which time-critical interrupts are still serviced while application code and non-time-critical interrupts are not. |
| RESET | Device reset. Part of the standard CPU architecture. |
| RUDE DT-DMA | A DT-DMA access which ignores the DBGM setting. |
| SCAN | The hardware which the host PC uses to control the |
| CONTROLLER | JTAG interface of the device. The XDS-510 (ISA board for PCs), XDS-510WS (SCSI peripheral for Suns and HPs), and XDS-510PP (PC parallel port peripheral) are scan controllers available from TI. |
| STEP | Execution of a single application code instruction before returning to the debug mode. |
| STOP MODE | Debug mode in which no interrupts are serviced and application code is not executed. |
| SUSPEND | See DBGACK. |
| TARGET | The device being emulated and/or tested. The term "target" comes a military phrase meaning "something likely to be destroyed". |
| TCK | JTAG Test Clock. Used to drive the IEEE 1149.1 state machine. |
| TDI | JTAG Test Data Input. Provides scan data input. |
| TDO | JTAG Test Data Output. Provides scan data output. |
| TIME-CRITICAL INTERRUPT | An interrupt which must be serviced within a certain time limit, even while debugging the application. To indicate that an interrupt is time-critical, the appropriate EIMR bit is set. |
| TLR | JTAG Test-logic-reset state. Test/emulation logic is reset/disabled while this signal is active. This is will be the case when an emulator is not connected or the emulator is reset. |
| TMS | JTAG Test Mode Select. Directs the next state of the IEEE 1149.1 state machine. |
| TRST- | JTAG Test-Logic-Reset (active low). Causes all test and debug logic in a TI device to be reset, along with the IEEE 1149.1 interface. |
| VISIBILITY | The ability to determine what a device is doing - what it's registers and memory contents are, what instructions it is about to execute, etc. |
| WATCHPOINT | Analysis event which triggers when the contents of a data bus match that of a comparator register. In contrast, a breakpoint usually refers to an address bus. |
| XDS-524 | The XDS-524 Breakpoint, Timing, and Trace Analyzer uses an C27x-E device to trace activity of the C27x's internal buses. |
| XDS_RESETN | Debug Reset signal. Provides a dedicated XDS-524 reset signal |

TABLE 20

Table of Nasty Boundary Conditions - Execution Control

| INTM | State | Debugger | Mode | Intreq | INT | Explain |
|---|---|---|---|---|---|---|
| Any | Any | | | None | No | No int request, so no int |
| Any | Halted | No step request | | DBGIER & IER | Yes | When halted, ints enabled by both DBGIER & IMR can be taken, even if INTM isn't set |
| Any | Halted | STEP 1 | Stopmode | Any | No | STEP 1 (ints blocked) in stopmode, so no int |
| Enable | Halted | RUN 1 | Stopmode | IER | Yes | RUN 1 in stopmode, so take enabled int |

TABLE 20-continued

Table of Nasty Boundary Conditions - Execution Control

| INTM | State | Debugger | Mode | Intreq | INT | Explain |
|---|---|---|---|---|---|---|
| Any | Halted | STEP 1 | Realtime | DBGIER & IER | Yes | STEP 1 in realtime - take DBGIER int and then STEP following instr |
| Enable | Halted | RUN 1 | Realtime | IER | Yes | RUN 1 in realtime - take IMR int to first instr of ISR |
| Disable | Halted | RUN 1 | Realtime | Any | No | RUN 1 in realtime - only take int if INTM = Enable |
| Enable | Halted | RUN N | | DBGIER & IER | Yes | RUN N - does it really make sense to require DBGIER? |
| Disable | Halted | RUN N | | Any | No | RUN N - only take int if INTM = Enable |
| Enable | Running | | | IER | Yes | Running - take enabled ints |
| Disable | Running | | | Any | No | RUN N - only take int if INTM = Enable |
| Enable | In ISR | | | IER | Yes | If interrupts are enabled inside an ISR, can take more ints |
| Disable | In ISR | | | Any | No | Only take int if INTM = Enable |

Table 21 lists memory mapped registers within processor core 15 (see FIG. 1) that are relevant to an understanding of this embodiment of the present invention. Processor core 15 also has a number of other memory mapped registers that are used for various control, status, and operational tasks. Table 22 describes bits within a status/control register ST1 of core processor 15 that are relevant to an understanding of the present invention, while Table 23 summarizes the bit assignments of status/control register ST3.

TABLE 21

Memory Mapped CPU Registers

| MMR Register | Word Address (Hex) | Register Description | Bit Field |
|---|---|---|---|
| ST1 | 07 | System control register | [15-00] |
| ST3 | 37 | System control register | [15-00] |

Emulation circuitry 851 implements the state machine described with reference to FIG. 3–FIG. 6. Interrupt circuitry according to FIG. 8–FIG. 14 is included with processor 100.

TABLE 22

Status/Control Register ST1

| | |
|---|---|
| ABORTI | bit 13: Emulation control<br>ABORTI = 1 Indicates that an interrupt service routine (ISR) is not be returned from. This signal is exported to an emulation support module. This clears the IDS (interrupt during debug) and HPI (high priority interrupt) bits in the debug status register and resets the Debug Frame Counter. This causes the emulation software to disregard any and all outstanding debug states entered from high priority interrupts since the processor was stopped by an emulation event.<br>ABORTI = 0 Default operating mode<br>ABORTI is cleared at reset. |
| EALLOW | bit 14: Emulation access enable bit<br>EALLOW = 1 Non CPU emulation registers write access enabled.<br>EALLOW = 0 Non CPU emulation registers write access disabled.<br>EALLOW bit is cleared at reset.<br>The current state of EALLOW is automatically |

TABLE 22-continued

Status/Control Register ST1

| | |
|---|---|
| | saved during an interrupt/trap operation.<br>The EALLOW bit is automatically cleared by the interrupt or trap. At the very start of an interrupt service routine (ISR), access to the non-CPU emulation registers is disabled. The user can re-enable access using the instruction: bit(ST1,EALLOW) = #1. The [d]return_int instruction restores the previous state of the EALLOW bit saved on the stack. The emulation module can override the EALLOW bit (clear only). The clear from The emulation module can occur on any pipeline slot. In case of conflict the emulator access get the highest priority. The CPU has the visibility on emulator override from EALLOW bit read. |
| DBGM | bit 15: Debug enable mask bit<br>DBGM = 1 Blocks debug events from time critical portions of the code execution. Debug access is disabled.<br>DBGM = 0 Debug access is enabled.<br>The current state of DBGM is automatically saved during an interrupt/trap operation. The DBGM bit is automatically set by the interrupt or trap. At the very start of an interrupt service routine (ISR), the debug events are blocked. The user can re-enable debug access using the instruction bit(ST1,DBGM) = #0. The [d]return_int instruction restores the previous state of the DBGM bit saved on the stack. The pipeline protection scheme requires that DBGM can be set/clear only by the dedicated instruction bit(ST1,k4) = #1, bit(ST1,k4) = #0.<br>ST1 access as memory mapped register or bit(Smem,k4) = #0, bit(Smem,k4) = #1, cbit(Smem,k4) have no effect on DBGM status bit. Emulation has R/W access to DBGM through DT-DMA. DBGM is set at reset. DBGM is ignored in STOP mode emulation from software policy. estop_0( ) and estop 1( ) instructions will cause the device to halt regardless of DBGM state. |
| INTM | Global Interrupt Enable |

TABLE 23

Status/Control Register ST3

| | |
|---|---|
| HOMP | Bit 0: Host only access mode to Peripherals |
| HOMR | Bit 1: Shared access mode to HPI RAM 802 |

TABLE 23-continued

Status/Control Register ST3

| | |
|---|---|
| HOMX | Bit 2: Host only access mode: |
| HOMY | Bit 3: Host only access mode: |
| | This bit operates the same as HOMX. |
| HINT | Bit 4: Host interrupt |
| XF | Bit 5: External Flag: |
| CBERR | Bit 6: CPU bus error: |
| MP/NMC | Bit 11: Microprocessor/microcomputer mode: |
| AVIS | Bit 12: Address visibility mode |
| CACLR | Bit 13: Cache clear |
| CAEN | Bit 14: Cache enable |
| CAFRZ | Bit 15: Cache freeze |
| ST3[10:7] | Unused status register bits |

Figure 18:
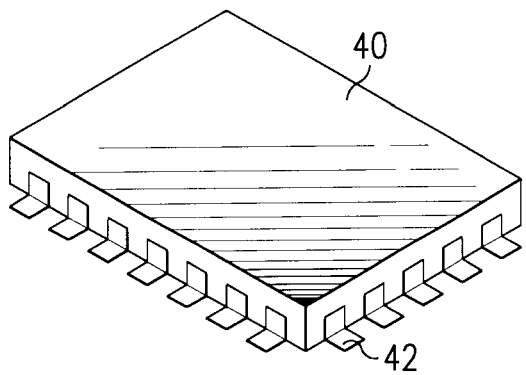
FIG. 18 is a schematic representation of an integrated circuit incorporating the processor.

FIG. 18 is a schematic representation of an integrated circuit incorporating processor 100. As shown, the integrated circuit includes a plurality of contacts for surface mounting. However, the integrated circuit could include other configurations, for example a plurality of pins on a lower surface of the circuit for mounting in a zero insertion force socket, or indeed any other suitable configuration.

Figure 19:
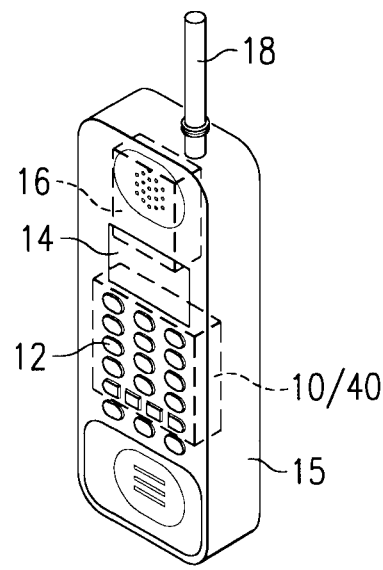
FIG. 19 is a schematic representation of a telecommunications device incorporating the processor of FIG. 1.

FIG. 19 illustrates an exemplary implementation of an example of such an integrated circuit in a mobile telecommunications device, such as a mobile telephone with integrated keyboard 12 and display 14. As shown in FIG. 19, the digital system 10 with processor 100 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Fabrication of data processing device 10 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

Thus, there has been described emulation and debug circuitry that can be incorporated into a variety of digital systems. A stop mode of operation is provided in which an associated processor stops processing instructions in response to a debug event. A real-time mode of operation is provided in which the processor stops processing background instructions in response to a debug event, but in which high priority interrupts are still processed. Interrupts are classified and processed accordingly when the processor is stopped by a debug event. While suspended for a debug event, a frame counter keeps track of interrupt debug state if multiple interrupts occur. While running or suspended, the emulation circuitry can jam an instruction into the instruction register of the processor to cause processor resources to be read or written on behalf of the emulation circuitry. Read/write transactions are qualified by an expected frame count to maintain correspondence between test host software and multiple debug/interrupt events.

In accordance with another aspect of the present invention, the machine state can be read or written qualified by an expected suspend state.

In accordance with another aspect of the invention, a processor provides the debug interface access to system resources (registers and memory) where access to the processor resources can be qualified by one or more lockout conditions.

The processor has access to the processor resources qualified by a program generated lockout, managed with the execution of instructions.

The processor has access to the processor resources qualified by an interrupt generated lockout, which is managed with the servicing of interrupts.

The processor has access to the processor resources qualified by the number of debug events that have not been completely processed.

The processor has access to the processor resources permitted when the execution of code is suspended.

The processor is connected to a test host where the debug software can direct the processor to use or ignore any combination of the lockout qualifiers The processor has circuitry to save the lockout qualifiers when interrupt services begin and are restored when interrupt services end.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system comprising a processor, wherein the processor is operable to execute a sequence of instructions obtained from an instruction bus connected to an instruction memory circuit, wherein the processor comprises:

system resources including registers and at least one memory circuit;

condition circuitry for storing at least one condition;

test port circuitry for receiving test commands from a remote test host;

emulation circuitry for debug events connected to the test port circuitry, operable to cause the processor to enter a debug suspend state in response to a debug event and to leave the debug suspend state to resume execution of the sequence of instruction in response to a command received by the test port circuitry, wherein execution of the sequence of instructions ceases while the processor is in the debug suspend state;

wherein the emulation circuitry is operable to access the system resources in response to an access command received by the test port circuitry if a first condition of the at least one condition is in a first state; and wherein the emulation circuitry is blocked from entering the debug state if the first condition is in a second state.

2. The digital system of claim 1, wherein the condition circuitry comprises debug enable mask bit (DBGM) circuitry operable to store either the first state or the second state in response to an instruction executed by the processor from the sequence of instructions.

3. The digital system of claim 1, further comprising:
interrupt circuitry for receiving a plurality of interrupt signals, operable to interrupt execution of the sequence of instructions, wherein the processor is operable to cease execution of the sequence of instructions in response to a first interrupt received by the interrupt circuitry and to execute a corresponding first interrupt service routine (ISR); and
wherein the condition circuitry comprises high priority interrupt (HPI) circuitry operable to store the second state in the first condition of the condition circuitry in response to the first interrupt and further operable to store the first state in the first condition of the condition circuitry at the completion of the first ISR, whereby debug events are blocked during execution of the first ISR.

4. The digital system of claim 3, wherein the processor is operable to save at least a first condition of the at least one condition as part of a first processor state during an interrupt context switch in response an interrupt signal; and
wherein the processor is further operable to restore the at least first condition during an interrupt return context switch.

5. The digital system of claim 1, wherein the emulation circuitry comprises:
a memory unit coupled for accessing the system resources in response to an access command received by the test port circuitry;
memory unit cycle type (MCT) circuitry connected to the memory unit operable to specify a selected access type to be performed by the memory unit; and
wherein the emulation circuitry is operable to access the system resources in response to an access command for the selected access type received by the test port circuitry even if the first condition of the at least one condition is in the second state, whereby a rude access type is performed by the emulation circuitry without regard to the condition circuitry.

6. The digital system of claim 1 being a cellular telephone, further comprising:
an integrated keyboard connected to the processor via a keyboard adapter;
a display connected to the processor via a display adapter;
radio frequency (RF) circuitry connected to the processor; and
an aerial connected to the RF circuitry.

7. A digital system comprising a processor, wherein the processor is operable to execute a sequence of instructions obtained from an instruction bus connected to an instruction memory circuit, wherein the processor comprises:
system resources including registers and at least one memory circuit;
condition circuitry for storing at least one condition;
test port circuitry for receiving test commands from a remote test host;
emulation circuitry for debug events connected to the test port circuitry, operable to cause the processor to enter a debug suspend state in response to a debug event and to leave the debug suspend state to resume execution of the sequence of instruction in response to a command received by the test port circuitry, wherein execution of the sequence of instructions ceases while the processor is in the debug suspend state;
debug frame counter (DFC) circuitry operable to store a debug frame number corresponding to a first debug event, wherein the test port circuitry is operable to communicate the frame count number to the external test host;
debug frame register (DFR) circuitry, operable to store an expected frame count number in response to a command received by the test port circuitry; and
wherein a first access command received by the test port circuitry is not performed if the frame count number is different from the expected frame count number.

8. A method of operating a digital system comprising a processor with system resources including registers and at least one memory circuit, comprising the steps of:
executing a sequence of instructions representative of a program;
setting a debug mode within the digital system to one of a plurality of states;
generating a debug event in response to executing the sequence of instructions; and
entering into a debug suspend state in which execution of the sequence of instructions is suspended in response to the debug event if the debug mode is in a first state, but blocking entry into the debug state if the debug mode is in a second state.

9. The method of claim 8, further comprising the steps of:
interrupting execution of the sequence of instructions in response to a certain interrupt event, and executing a corresponding interrupt service routine (ISR); and
setting the debug mode to the second state in response to the certain interrupt event, and then setting the debug mode to the first state at the completion of the ISR, whereby debug events are blocked during execution of the ISR.

10. The method of claim 8, further comprising the steps of:
generating a unique frame count number corresponding to a first debug event, and communicating the frame count number to the external test host;
storing an expected frame count number in response to a command received by the test port circuitry; and
receiving an access command that includes a frame count number from the remote test host, wherein the access command is not performed if the received frame count number is different from the expected frame count number.

11. The method of claim 8, further comprising the steps of:
saving the state of the debug mode as part of a first processor state during an interrupt context switch in response an interrupt event; and
restoring the state of the debug mode during an interrupt return context switch.

* * * * *